(12) United States Patent
Bryne

(10) Patent No.: US 7,877,904 B2
(45) Date of Patent: *Feb. 1, 2011

(54) CLEAT ASSEMBLY FOR CLIPLESS PEDAL

(75) Inventor: Richard M. Bryne, Del Mar, CA (US)

(73) Assignee: Speedplay, Inc., San Diego, CA (US)

( * ) Notice: Subject to any disclaimer, the term of this patent is extended or adjusted under 35 U.S.C. 154(b) by 668 days.

This patent is subject to a terminal disclaimer.

(21) Appl. No.: 11/779,206

(22) Filed: Jul. 17, 2007

(65) Prior Publication Data

US 2008/0110294 A1    May 15, 2008

Related U.S. Application Data

(63) Continuation-in-part of application No. 11/250,911, filed on Oct. 13, 2005, now Pat. No. 7,472,498.

(51) Int. Cl.
    *A43B 5/14* (2006.01)
(52) U.S. Cl. .......................................... 36/131
(58) Field of Classification Search ................... 36/131; 74/594.6, 594.4
    See application file for complete search history.

(56) References Cited

U.S. PATENT DOCUMENTS

| | | | | |
|---|---|---|---|---|
| 4,827,797 A | * | 5/1989 | Le Faou et al. | ............ 74/594.6 |
| 4,942,778 A | | 7/1990 | Bryne | |
| 5,213,009 A | | 5/1993 | Bryne | |
| 5,606,894 A | | 3/1997 | Bryne | |
| 5,657,558 A | | 8/1997 | Pohu | |
| 5,687,619 A | | 11/1997 | Bryne | |
| 5,727,429 A | | 3/1998 | Ueda | |
| 5,862,716 A | | 1/1999 | Bryne | |
| 6,244,136 B1 | | 6/2001 | Chen | |
| 6,494,117 B1 | * | 12/2002 | Bryne | ....................... 74/594.6 |
| 7,017,445 B2 | | 3/2006 | Bryne | |

(Continued)

FOREIGN PATENT DOCUMENTS

EP       0 153 210       8/1985

(Continued)

*Primary Examiner*—Ted Kavanaugh
(74) *Attorney, Agent, or Firm*—Sheppard Mullin Richter & Hampton LLP

(57) ABSTRACT

An improved cleat assembly is disclosed, the assembly containing one or more spring clips configured for releasably securing the assembly to a bicycle pedal or the like. Specifically, the cleat assembly is configured such that an improper over-tightening of the cleat onto the sole of a user's shoe has substantially no effect on the free flexing of the spring clip while it is engaging or disengaging to/from the pedal. In addition, the cleat assembly incorporates one or more soft elastomeric caps that frictionally engage the ground when the user walks about, to provide improved traction and to eliminate undesired wear of critical assembly components. Further, for embodiments of cleat assemblies of the kind incorporating one or more adjustable set screws for adjusting the assemblies' float angles, threaded apertures for the set screws are formed by the confronting surfaces of a plastic upper plate and a metallic bottom plate, wherein the threads are formed only in the plastic upper plate. This allows the upper plate to be conveniently formed of an injection-molded plastic material and the bottom plate to be conveniently stamped from a piece of sheet metal.

22 Claims, 24 Drawing Sheets

U.S. PATENT DOCUMENTS

| | | | |
|---|---|---|---|
| 7,472,498 B2 * | 1/2009 | Bryne | ................... 36/131 |
| 2001/0008093 A1 | 7/2001 | Heim | |
| 2004/0187635 A1 * | 9/2004 | Bryne | ................... 74/594.4 |
| 2007/0084086 A1 | 4/2007 | Bryne | |

FOREIGN PATENT DOCUMENTS

| | | |
|---|---|---|
| EP | 0 293 340 | 11/1988 |
| FR | 2 775 424 | 9/1999 |
| JP | 05111402 | 7/1993 |

* cited by examiner

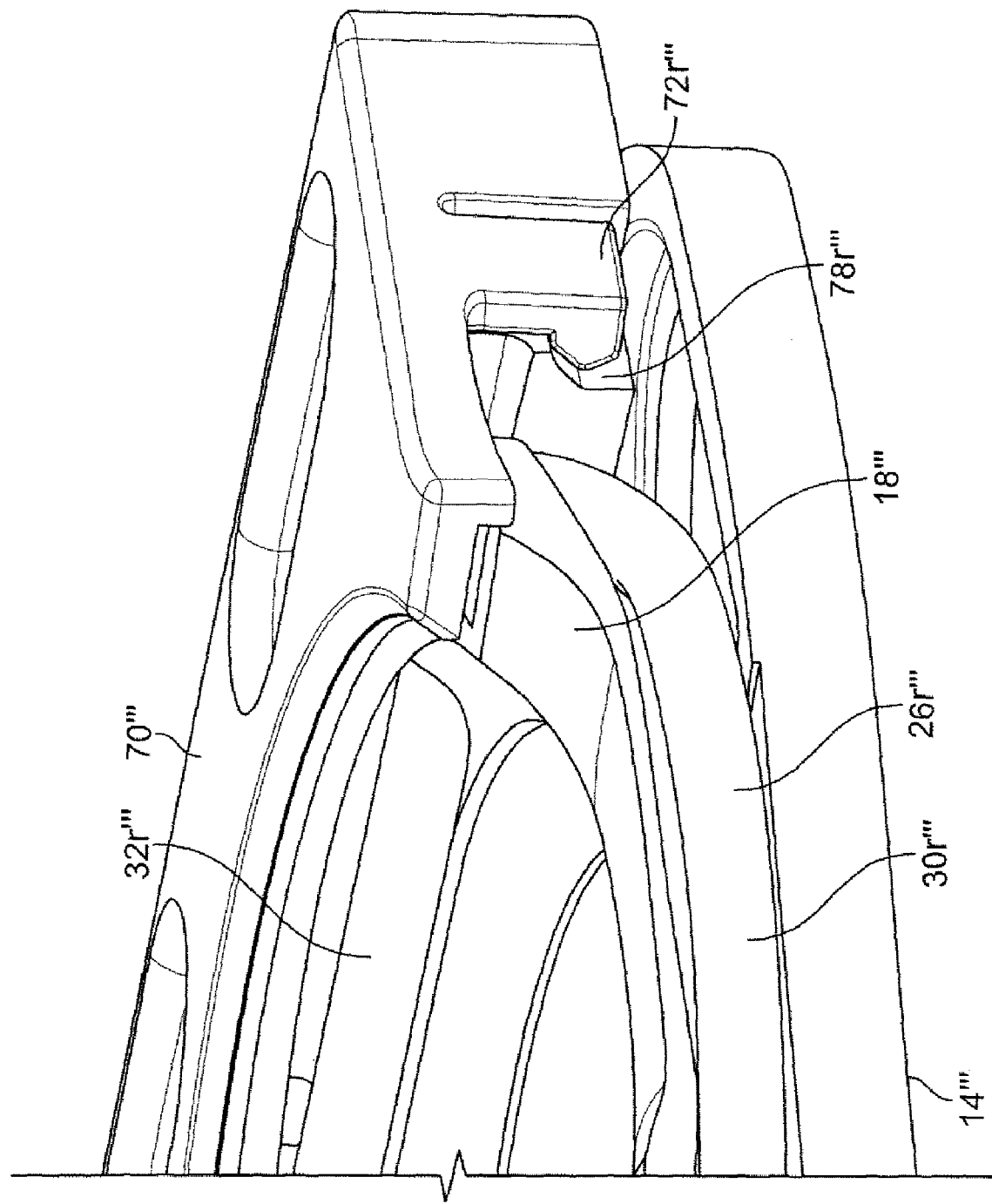

CLEAT ASSEMBLY FOR CLIPLESS PEDAL

CROSS REFERENCE TO RELATED APPLICATIONS

This is a continuation-in-part of U.S. application patent Ser. No. 11/250,911, filed on Oct. 13, 2005, the entire contents of which are herein incorporated by reference.

BACKGROUND OF THE INVENTION

This invention relates generally to cleat assemblies configured for releasable securement to pedals for bicycles and the like, and, more particularly, to cleat assemblies incorporating flexible spring clips for releasable engagement with the pedals.

Cleat assemblies of this particular kind typically include a spring housing and an overlaying bottom plate configured to be attached to the sole of a user's shoe. The spring housing and bottom plate, together, define a central opening sized and configured to conformably receive a pedal. The spring housing supports one or more spring clips adjacent to the central opening, for engaging and releasably retaining the pedal.

When the cleat assembly is disengaged from a pedal and the user is walking about on the ground, the cleat assembly's bottom plate is in direct engagement with the ground. The bottom plate typically is formed of a metallic material, so this direct engagement has required the user to use care when walking about. This direct engagement also has led to undesired wear of the bottom plate. Additionally, the metallic material has required the user to use care not to scratch the pedal when engaging the cleat assembly to the pedal.

In the past, improper over-tightening of the bottom plate over the spring housing has sometimes unduly restricted free flexing movement of the spring clip, thus sometimes making it more difficult to engage or disengage the spring clip to/from the pedal. Users have overcome this drawback in the past only by exercising proper care when tightening the bottom plate.

Some cleat assemblies of this particular kind have been configured to provide an adjustable float angle, typically being provided by one or more set screws. In the past, the set screws have been supported in threaded apertures, which typically have been formed by a manual tapping procedure. This has been found to be unduly labor-intensive and expensive.

In the past, removing a cleat assembly of this particular kind from the sole of a user's shoe sometimes required the user to disassemble the entire cleat assembly. This made re-installation of the cleat assembly more difficult and raised the possibility that the user might misplace parts of the cleat assembly while it was detached from the shoe.

In the past, the set screws and other screws present in cleat assemblies of this particular kind had a tendency to work their way loose during use of the cleat assembly. One way that users counteracted this problem was by using an adhesive, such as Loctite. The use of a separate adhesive has been found to be unduly labor-intensive and undesirable.

It should be appreciated from the foregoing description that there is a need for an improved cleat assembly that overcomes the drawbacks discussed above. Specifically, there is a need for a cleat assembly configured to allow for a range of tightening of its components without substantially affecting the free flexing of the assembly's one or more spring clips. Further, there is a need for a cleat assembly configured to eliminate direct engagement between metallic components and the ground when the assembly is disengaged from a pedal and the user is walking about. Further, there is a need for an improved cleat assembly of a kind incorporating one or more set screws for adjusting the assembly's float angle, which eliminates the need to manually tap a threaded aperture for supporting each set screw. Further, there is a need for an improved cleat assembly configured so that it can be removed from the sole of a user's shoe without requiring the user to disassemble the entire cleat assembly. Further, there is a need for an improved cleat assembly configured so that the set screws and other screws present in the cleat assembly stay in position without the need for a separate adhesive. The present invention satisfies these needs and provides further related advantages.

SUMMARY OF THE INVENTION

The present invention is embodied in a cleat assembly incorporating one or more spring clips for releasably securing the assembly to a clipless pedal, while allowing for a range of tightening of its components without substantially affecting the free flexing of the one or more spring clips. More particularly, the cleat assembly includes a first plate disposed adjacent to the underside of a user's shoe, and a second plate disposed over the first plate, wherein the second plate includes a forward flange projecting forward of a forward end of the first plate and a rearward flange projecting rearward of a rearward end of the first plate. An aperture is defined in the second plate, which is sized and configured to receive the clipless pedal. In addition, a space is defined between the first and second plates, for accommodating the one or more spring clips that can releasably secure the assembly to the clipless pedal. The forward and rearward flanges of the second plate are configured for attachment either directly to the underside of the user's shoe or to a base plate attached to the underside of the user's shoe, without affecting the size of the space between the first and second plates.

In other, more detailed features of the invention, the cleat assembly further includes a forward cap disposed over the forward flange of the second plate, and a rearward cap disposed over the rearward flange of the second plate. These caps engage the ground when the user walks thereon. Each cap preferably is disposed over substantially the entire surface of its associated flange. In addition, the caps preferably both incorporate a molded elastomeric material, e.g., polyurethane.

In alternative embodiments of the invention, the cleat assembly includes a unitary cap preferably disposed over substantially the entire bottom surface of the second plate. The unitary cap engages the ground when the user walks thereon and incorporates a molded elastomeric material, e.g., polyurethane. The unitary cap helps the user's foot to roll comfortably when the user walks, and helps keep the second plate from scratching the bicycle pedal. The second plate is configured to have two hooks that engage the first plate, while the unitary cap is configured to have two tabs that engage the first plate. Alternatively, the unitary cap is configured to have four tabs that engage the first plate. The hooks and tabs secure the second plate and unitary cap to the first plate, keeping the first plate, second plate, and spring clip secured together both prior to the initial installation of the cleat assembly and also in the event that the user detaches the cleat assembly from the shoe. This feature makes both the initial installation and any re-installation of the cleat assembly easier and reduces the possibility that the user might misplace parts of the cleat assembly while it is detached from the shoe.

In a preferred embodiment of the invention, the cleat assembly is configured to provide an adjustable float angle. In this embodiment, the assembly's spring clip can releasably engage the clipless pedal in a manner that allows limited rotation of the first and second plates relative to the pedal, while the spring clip remains rotationally locked to the pedal. The cleat assembly further includes one or two set screws defining a space for receiving a finger that is part of the spring clip. In operation, the cleat assembly's first and second plates are free to rotate relative to the pedal through a float angle whose limits are reached when a set screw comes into contact with the finger of the spring clip. Rotation beyond that limit causes the spring clip to release its engagement with the pedal.

The size of the float angle can be adjusted by selectively rotating the one or more set screws, to vary the size of the space that receives the spring clip's finger. Advantageously, each set screw is received within a threaded aperture that is defined by confronting surfaces of the first and second plates. The first plate preferably comprises a molded plastic material, and the second plate preferably comprises a metallic material, preferably steel. In addition, manufacturability is enhanced by configuring only the confronting surface of the first plate to be threaded; the confronting surface of the second plate can remain unthreaded.

In one embodiment of the invention, two holes are formed in the confronting surfaces of the second plate that retain the two set screws. The two holes allow the two set screws to contact the elastomeric material of the cap or caps, inhibiting the set screws from working their way loose from the cleat assembly. In this way, the holes act like threadlockers, helping to keep the set screws secured in the cleat assembly.

Other screws secure the first and second plates together. In a preferred embodiment of the invention, the cap or caps are configured to have a plurality of openings therein, each of the plurality of openings being configured to receive the head of at least one screw. The openings in the cap or caps are sized so that the screw heads contact the sidewalls of the openings, inhibiting the screws from working their way loose. In this way, the openings act like threadlockers, helping to keep the screws secured in place.

Other features and advantages of the present invention should become apparent from the following description of the preferred embodiments, taken in conjunction with the accompanying drawings, which illustrate, by way of example, the principles of the invention.

BRIEF DESCRIPTION OF THE DRAWINGS

FIG. 26 is a close-up perspective view of the fourth embodiment of the cleat assembly, showing the inner tabs of the unitary cap engaging the spring housing.

DESCRIPTION OF THE PREFERRED EMBODIMENTS

Figure 1:
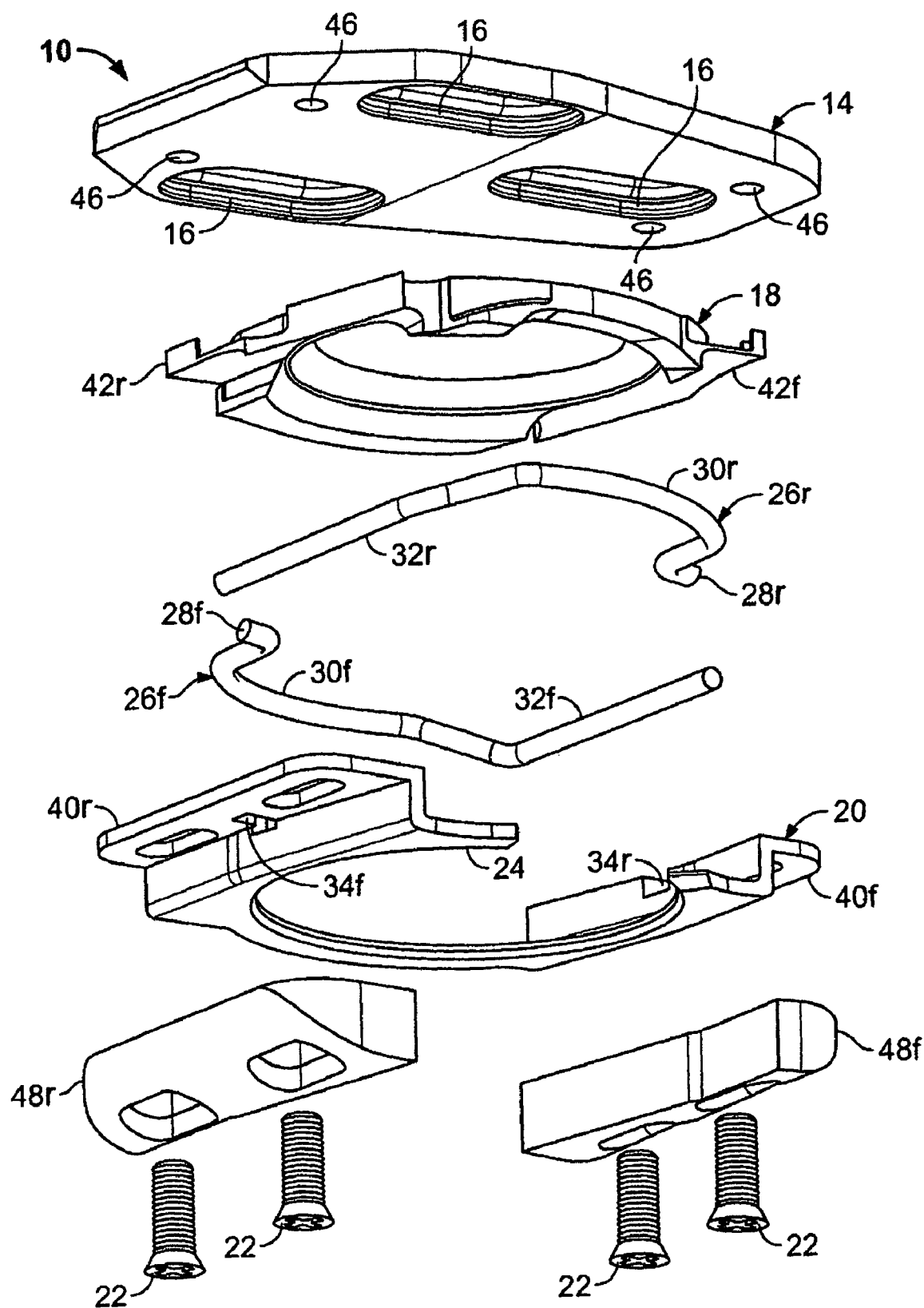
FIG. 1 is an exploded perspective view of the underside of a first embodiment of a clear assembly in accordance with the invention.
Figure 2:
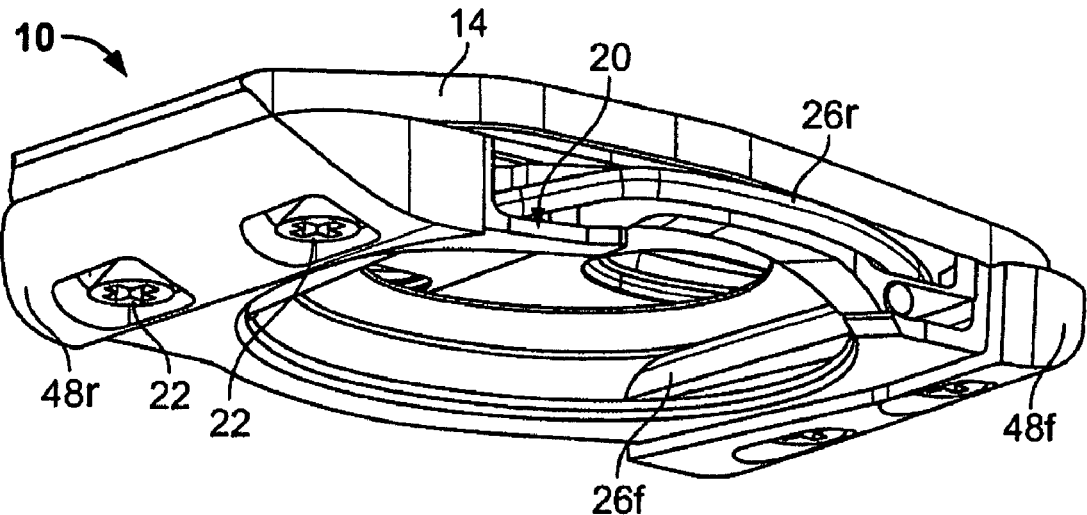
FIG. 2 is a perspective view of the underside of the first embodiment of the cleat assembly, shown in its assembled condition.
Figure 3:
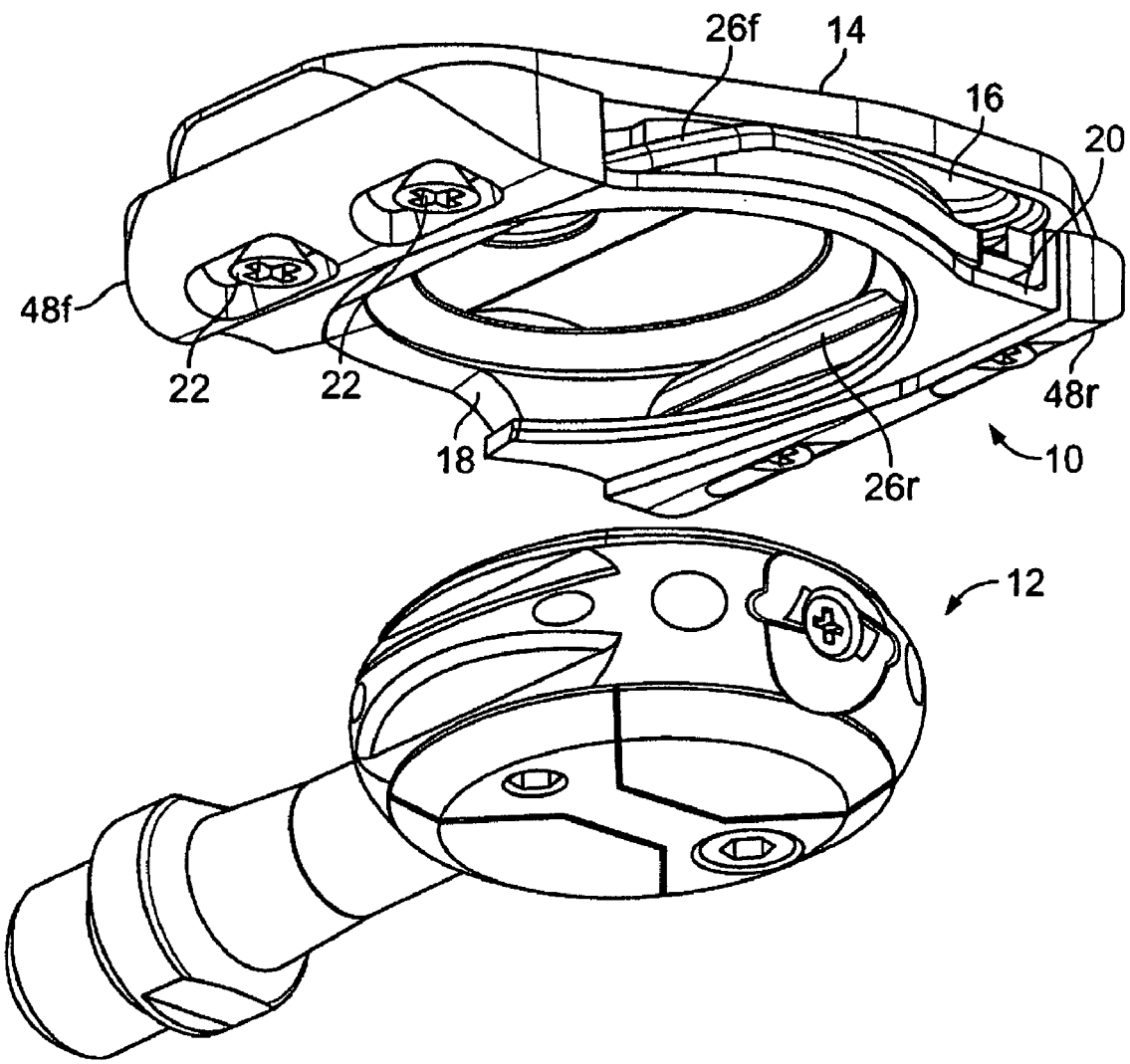
FIG. 3 is a perspective view of the underside of the first embodiment of the cleat assembly, showing the cleat assembly positioned above a pedal.
Figure 4:
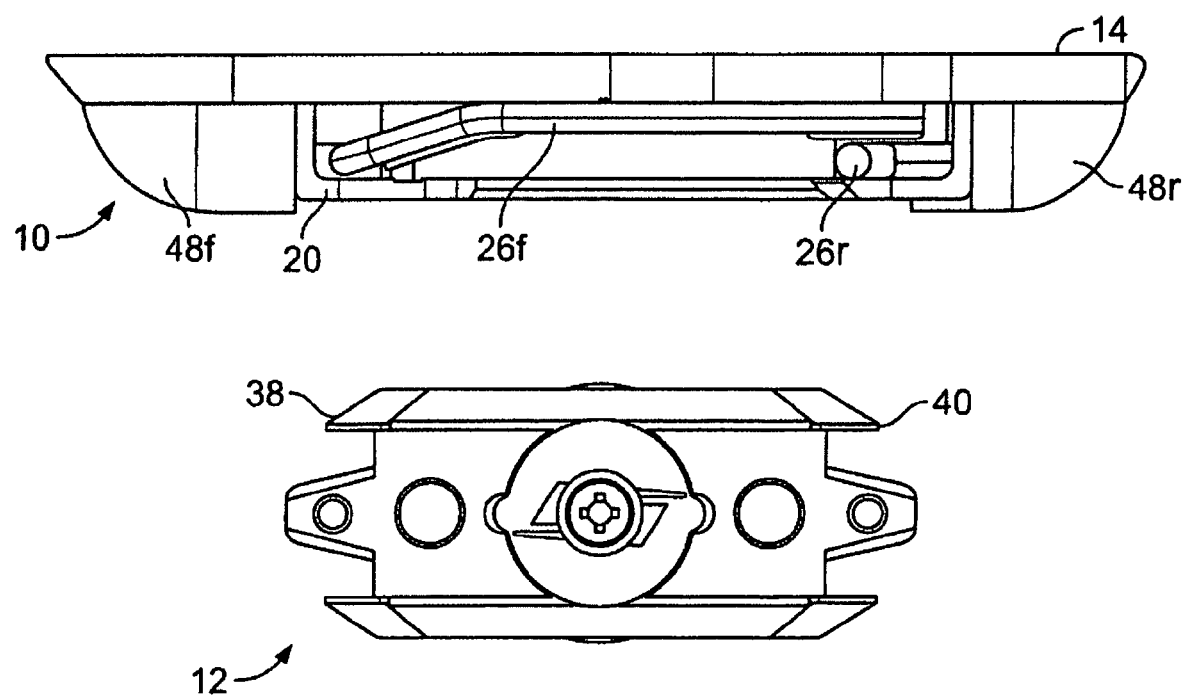
FIG. 4 is an elevational view of the first embodiment of the cleat assembly, showing the cleat assembly positioned immediately above the pedal.
Figure 5:
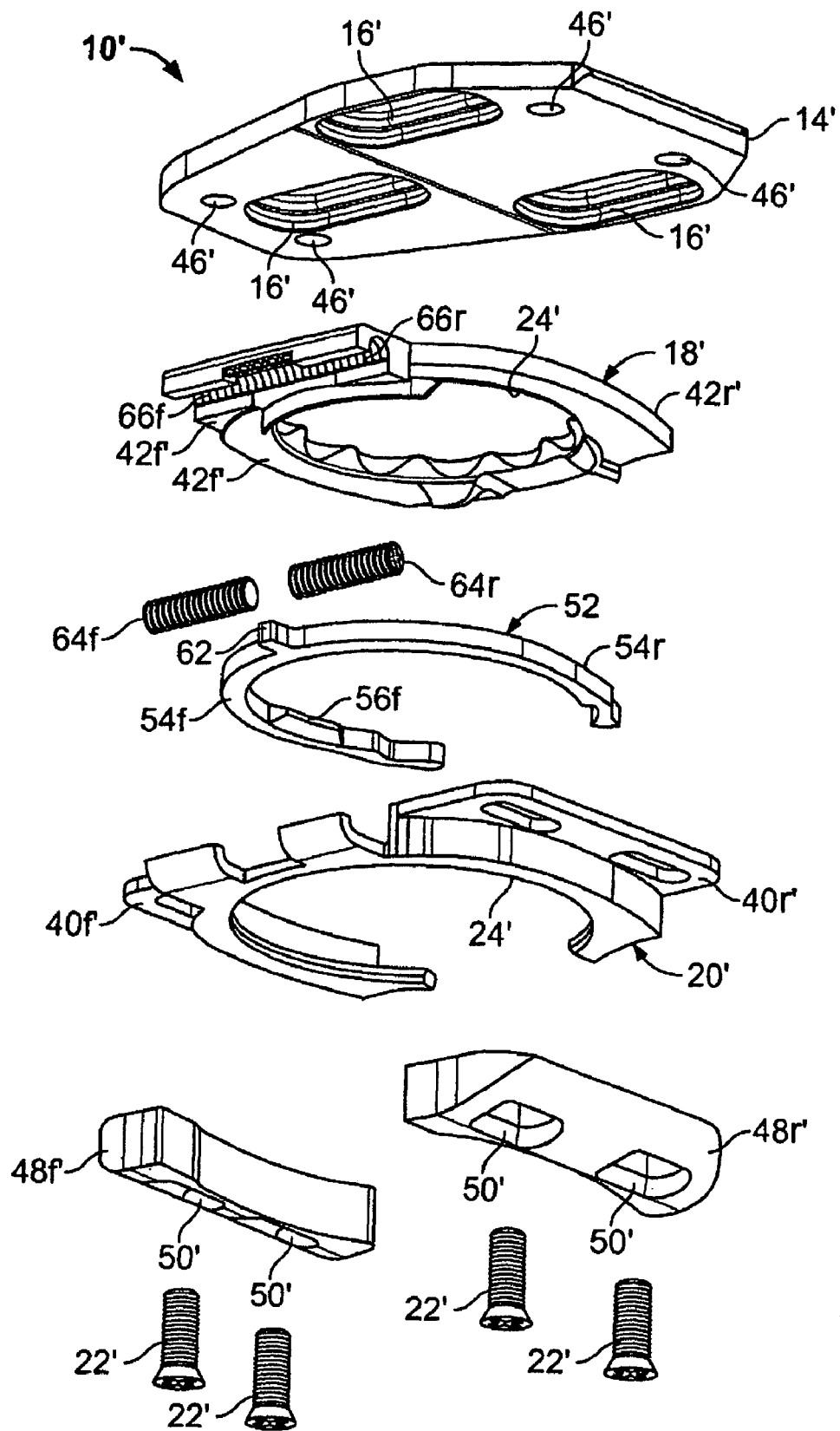
FIG. 5 is an exploded perspective view of the underside of a second embodiment of a cleat assembly in accordance with the invention.
Figure 6:
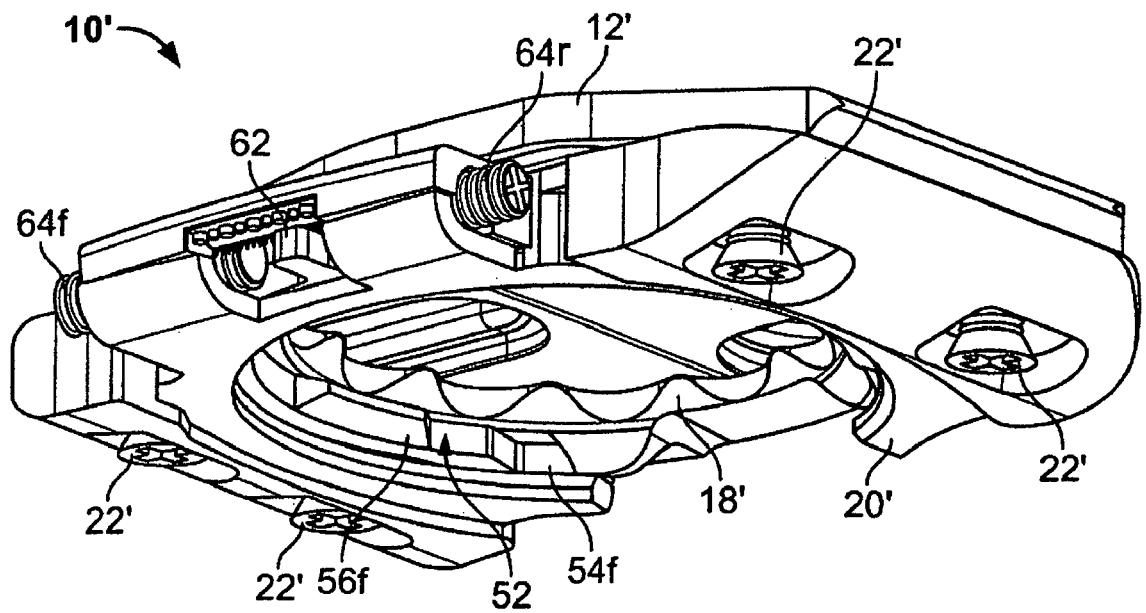
FIG. 6 is a perspective view of the underside of the second embodiment of the cleat assembly, shown in its assembled condition.
Figure 7:
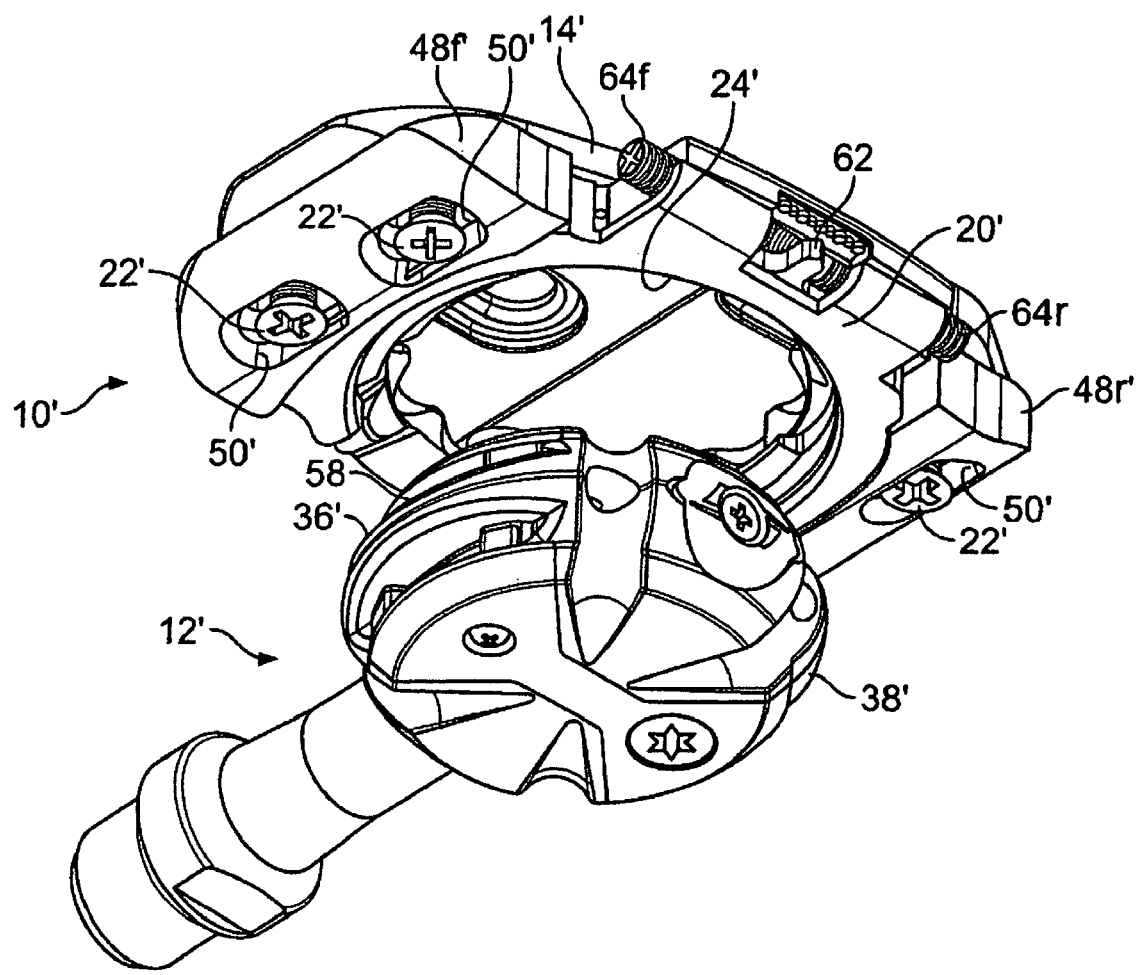
FIG. 7 is a perspective view of the underside of the second embodiment of the cleat assembly, taken from a different viewpoint from that of FIGS. 5 and 6 and showing the cleat assembly positioned adjacent to a pedal.
Figure 8:
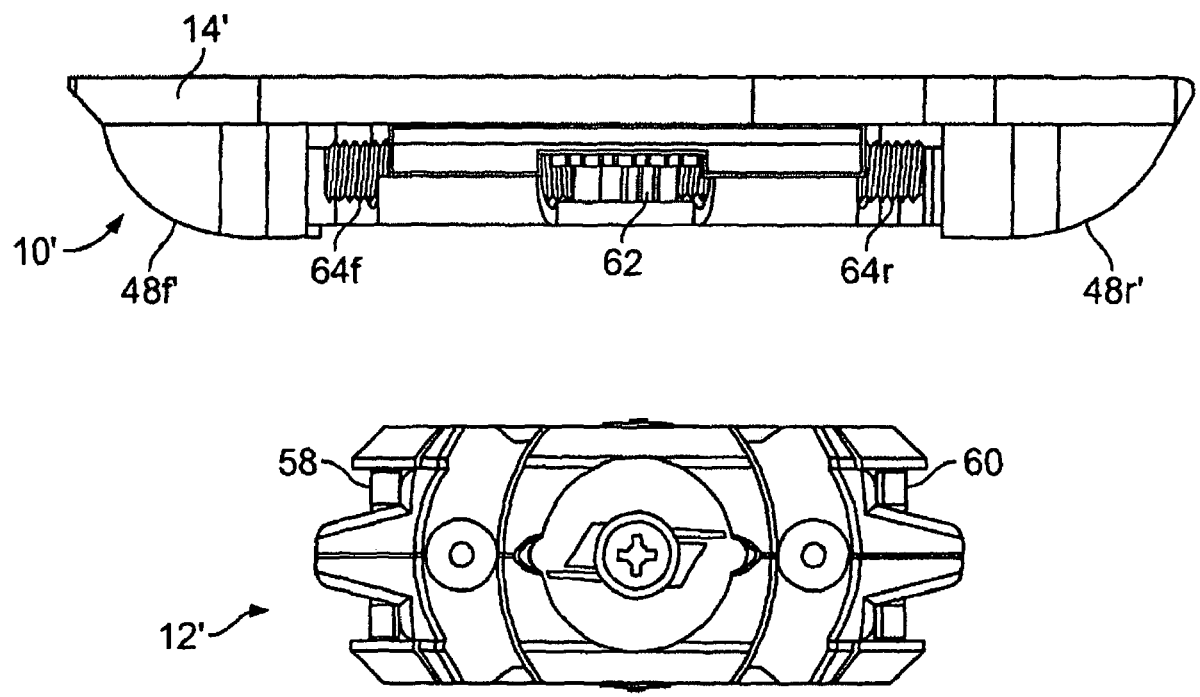
FIG. 8 is an elevational view of the second embodiment of the cleat assembly, showing the cleat assembly positioned immediately above the pedal.

With reference now to the illustrative drawings, and particularly to FIGS. 1-4, there is shown a first embodiment of a cleat assembly 10 in accordance with the invention, configured for attachment to the sole of a user's shoe (not shown) and for releasable securement to a bicycle pedal 12 (FIGS. 3 and 4). The particular cleat assembly depicted is configured for attachment to the user's left shoe, but it will be appreciated that a similar cleat assembly could be oppositely configured for attachment to the user's right shoe. The cleat assembly includes a plastic base plate 14 configured to be secured to the shoe's sole (not shown) by screws (not shown) extending through three elongated openings 16, and it further includes a plastic spring housing 18 and a steel bottom plate 20 configured to be secured, together, by four screws 22 to the plastic base plate 14. The spring housing 18 and bottom plate 20, together, define a circular central opening 24 sized and shaped to conformably receive the pedal 12. A forward spring clip 26f and a rearward spring clip 26r are mounted between the spring housing 18 and the bottom plate 20, for releasably engaging the pedal when the cleat assembly is positioned over the pedal.

More particularly, the forward and rearward spring clips 26f, 26r each are formed from a single length of spring steel, which is bent into a special shape that includes a pivot section 28f, 28r; an arcuate mid-section 30f, 30r; and a generally straight engagement section 32f, 32r. The pivot sections 28f, 28r are confined within small recesses 34f, 34r formed in the bottom plate; the arcuate mid-sections 30f, 30r extend around portions of the circular central opening 24; and the straight engagement sections 32f, 32r extend as chords through forward and rearward portions of the central opening.

The straight engagement section 32f of the forward spring clip 26f is positioned to engage and retain a forward edge 36 of the pedal 12 (FIGS. 3 and 4), and the straight engagement section 32r of the rearward spring clip 26r is positioned to engage and retain the pedals rearward edge 38. Sufficient space is provided forward of the forward engagement section 32f, and rearward of the rearward engagement section 32r, to allow the two engagement sections to flex apart as the cleat assembly 10 is engaged with the pedal. The cleat assembly can be disengaged from the pedal by rotating the heel of the foot outward, to forcibly retract the forward and rearward spring clips' engagement sections. In this regard, the shape and function of the forward and rearward spring clips 26f, 26r are similar to that of corresponding components incorporated into a cleat assembly disclosed in U.S. Pat. No. 5,213,009, issued in the name of Richard M. Bryne, which is incorporated herein by reference.

In the past, free flexing movement of the forward and rearward spring clips has sometimes been impaired by an improper over-tightening of the cleat assembly's bottom plate relative to its spring housing. The cleat assembly 10 of FIGS. 1-4 overcomes this impairment by ensuring that tightening of the bottom plate 20 over the spring housing 18 has substantially no effect on the size of the space that accommodates the forward and rearward spring clips 26f, 26r. This is accomplished by configuring the bottom plate to include a forward flange 40f projecting forward of the spring housing's forward end 42f and a rearward flange 40r projecting rearward of the spring housing's rearward end 42r. Each flange incorporates two elongated openings 44 that align with threaded apertures 46 formed in the plastic base plate 14. The flanges are tightened against the base plate using the screws 22, which engage the base plate's threaded apertures. The degree of tightening has no substantial effect on the size of the space between the bottom plate 20 and the spring housing 18, whereby flexing of the forward and rearward spring clips 26f, 26r during engagement and disengagement from the pedal is unimpaired.

The cleat assembly 10 further includes forward and rearward caps 48f, 48r that overlay the respective forward and rearward flanges 40f, 40r of the bottom plate 20. Each cap includes a pair of elongated, beveled openings 50 aligned with the openings 44 of the corresponding flange, such that the screws 22 function to secure not only the bottom plate over the spring housing 18, but also the caps over the flanges. The caps are sized to project slightly above the exposed surface of the bottom plate, and the exposed edges of the caps are rounded. The bottom plate thereby is slightly recessed from the caps, such that only the caps engage the ground when the user walks about. Preferably, the caps are formed of a molded elastomeric material such as polyurethane, to provide improved frictional engagement with the ground and thereby to make walking more comfortable for the user. In addition, if the caps become unduly worn from substantial walking, they can be readily replaced. The caps' rounded shapes also improve the cleat's aerodynamics.

With reference now to FIGS. 5-8, there is shown a second embodiment of a cleat assembly 10' in accordance with the invention. The cleat assembly 10' has many of the same components and attributes as the cleat assembly 10 of FIGS. 1-4, but it differs in that it substitutes a single horseshoe-shaped spring clip 52 for the forward and rearward spring clips 26f, 26r of the first embodiment. Components of the two cleat assemblies that correspond to each other are identified in the drawings using the same reference numerals, with the reference numerals for the components of the embodiment of FIGS. 5-8 including prime marks ('). Many of the components and functions of this second cleat assembly embodiment are the same as those of the cleat assembly disclosed in U.S. Pat. No. 6,494,117, issued in the name of Richard M. Bryne and incorporated herein by reference. As was the case with the cleat assembly 10 depicted in FIGS. 1-4, the cleat assembly 10' depicted in FIGS. 5-8 is configured for attachment to the user's left shoe, but it will be appreciated that a similar cleat assembly could be oppositely configured for attachment to the user's night shoe.

The cleat assembly 10' of FIGS. 5-8 is similar to the cleat assembly 10 of FIGS. 1-4 in that it is configured to allow its steel bottom plate 20' to be tightened over the plastic spring housing 18' without substantially affecting the size of the space that accommodates the horseshoe-shaped spring clip 52. The cleat assembly 10', likewise, is configured such that only the elastomeric caps 48f, 48r' engage the ground when the user walks about.

In addition, the cleat assembly 10' is configured to provide an adjustable float angle, which is an amount of angular rotation the cleat assembly, and thus the user's shoe, can undergo before disengaging from the pedal 12'. This float reduces restrictions on the natural rotation of the user's leg during pedaling, and thus reduces the possibility of injury. Typical pedal/cleat assemblies systems have provided float ranges as high as ±7.5°.

The horseshoe-shaped spring clip 52 of the cleat assembly 10 of FIGS. 5-8 includes a forward leg 54f and a rearward leg 54r, which are supported on the spring housing 18'. The forward leg 54f is configured to engage and retain the forward edge 36' of the pedal 12', and the rearward leg 54r is configured to engage and retain the rearward edge 38' of the pedal. In particular, an inwardly projecting tongue 56f of the forward leg 54f is received in a correspondingly shaped recess 58 in the pedal's forward edge, and a similar inwardly projecting tongue 56r of the rearward leg 54r is received in a correspondingly shaped recess 60 in the pedal's rearward edge.

After the horseshoe-shaped spring clip 52 has engaged and retained the pedal 12', with the spring clip's tongues 56f, 56r received in the pedal's respective recesses 58, 60, the cleat assembly 10' is free to rotate relative to the pedal to a limited extent, both clockwise and counterclockwise. During this limited rotation, the spring clip remains locked to the pedal, and the remainder of the cleat assembly rotates relative to the spring clip. The amount of rotation is limited when a finger 62 projecting outwardly from the spring clip's mid-point reaches one of two adjustable set screws 64f, 64r. The float angle is increased by retracting the set screws, and it is decreased by extending the set screws.

The set screws 64f, 64r are received in threaded apertures 66f, 66r defined by confronting surfaces of the cleat assembly's steel bottom plate 20' and its plastic spring housing 18'. Advantageously, female threads for engaging the two set screws need be formed only in the plastic spring housing; the confronting surface of the bottom plate can remain smooth and unthreaded. This allows the bottom plate to be made by stamping it from a single piece of steel sheet metal and then bending over two projections to form the confronting surfaces that retain the set screws. The threads located in the confronting surfaces of the plastic spring housing are formed readily when the housing is produced, e.g., by injection molding.

With reference now to FIGS. 9-19, there is shown a third embodiment of a cleat assembly 10" in accordance with the invention. The cleat assembly 10" has many of the same components and attributes as the cleat assembly 10' of FIGS. 5-8, but it differs in that it substitutes a unitary elastomeric cap 70 for the forward and rearward elastomeric caps 48f' and 48r' of the second embodiment. Components of the two cleat assemblies that correspond to each other are identified in the drawings using the same reference numerals, with the reference numerals for the components of the embodiment of FIGS. 9-19 including double prime marks ("). As was the case with the cleat assembly 10' depicted in FIGS. 5-8, the cleat assembly 10" depicted in FIGS. 9-19 is configured for attachment to the user's left shoe, but it will be appreciated that a similar cleat assembly could be oppositely configured for attachment to the user's right shoe.

The cleat assembly 10" of FIGS. 9-19 is similar to the cleat assembly 10' of FIGS. 5-8 in that it is configured to allow its steel bottom plate 20" to be tightened over the plastic spring housing 18" without substantially affecting the size of the space that accommodates the horseshoe-shaped spring clip 52". The cleat assembly 10", likewise, is configured such that only the unitary elastomeric cap 70 engages the ground when the user walks about. The cleat assembly 10" is configured to engage the pedal 12' shown in FIGS. 7 and 8.

In addition, the cleat assembly 10" is configured to provide an adjustable float angle, which is an amount of angular rotation the cleat assembly, and thus the user's shoe, can undergo before disengaging from the pedal 12'. This float reduces restrictions on the natural rotation of the user's leg during pedaling, and thus reduces the possibility of injury. Typical pedal/cleat assemblies systems have provided float ranges as high as ±7.5°.

The horseshoe-shaped spring clip 52" of the cleat assembly 10" of FIGS. 9-19 includes a forward leg 54f" and a rearward leg 54r", which are supported on the spring housing 18". The forward leg 54f" is configured to engage and retain the forward edge 36' of the pedal 12', and the rearward leg 54r" is configured to engage and retain the rearward edge 38' of the pedal. In particular, an inwardly projecting tongue 56f" of the forward leg 54f" is received in a correspondingly shaped recess 58 in the pedal's forward edge, and a similar inwardly projecting tongue 56r" of the rearward leg 54r" is received in a correspondingly shaped recess 60 in the pedal's rearward edge.

After the horseshoe-shaped spring clip 52" has engaged and retained the pedal 12', with the spring clip's tongues 56f", 56r" received in the pedal's respective recesses 58, 60, the cleat assembly 10" is free to rotate relative to the pedal to a limited extent, both clockwise and counterclockwise. During this limited rotation, the spring clip remains locked to the pedal, and the remainder of the cleat assembly rotates relative to the spring clip. The amount of rotation is limited when a finger 62" projecting outwardly from the spring clip's mid-point reaches one of two adjustable set screws 64f", 64r". The float angle is increased by retracting the set screws, and it is decreased by extending the set screws.

The set screws 64f", 64r" are received in threaded apertures 66f", 66r" defined by confronting surfaces of the cleat assembly's steel bottom plate 20" and its plastic spring housing 18". Advantageously, female threads for engaging the two set screws need be formed only in the plastic spring housing; the confronting surface of the bottom plate can remain smooth and unthreaded. This allows the bottom plate to be made by stamping it from a single piece of steel sheet metal and then bending over two projections to form the confronting surfaces that retain the set screws. The threads located in the confronting surfaces of the plastic spring housing are formed readily when the housing is produced, e.g., by injection molding.

As noted above, the cleat assembly 10" includes a unitary elastomeric cap 70. The unitary elastomeric cap 70 is preferably bonded to the bottom surface 86" of the steel bottom plate 20" and disposed over substantially the entire bottom surface of the bottom plate. The unitary elastomeric cap 70 engages the ground when the user walks thereon and incorporates a slip-resistant, molded elastomeric material, e.g., polyurethane. The unitary elastomeric cap 70 helps the user's foot to roll comfortably when the user walks, and helps keep the steel bottom plate 20" from scratching the bicycle pedal.

Figure 9:
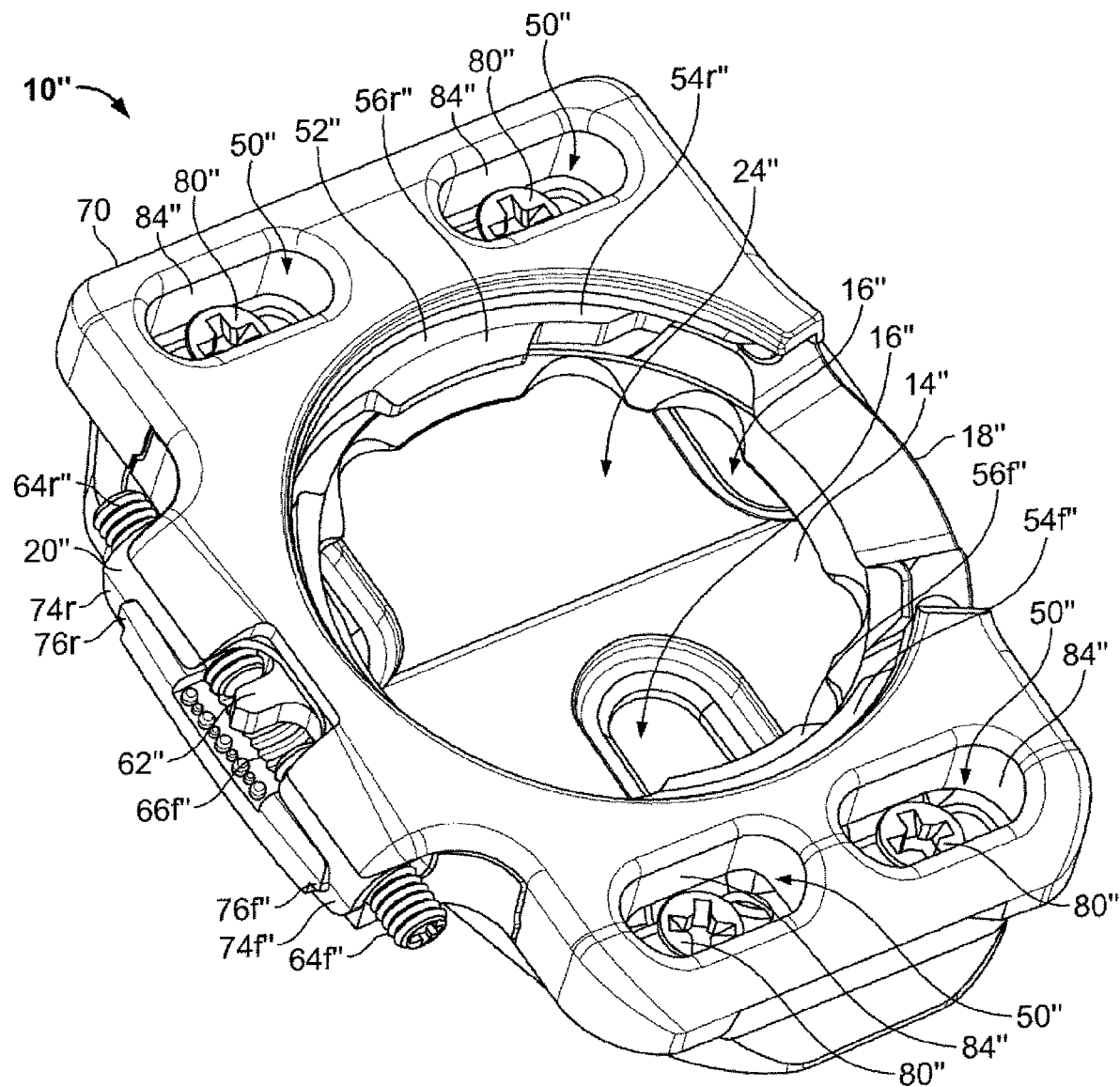
FIG. 9 is a perspective view of a third embodiment of a cleat assembly in accordance with the invention, shown in its assembled condition.
Figure 10:
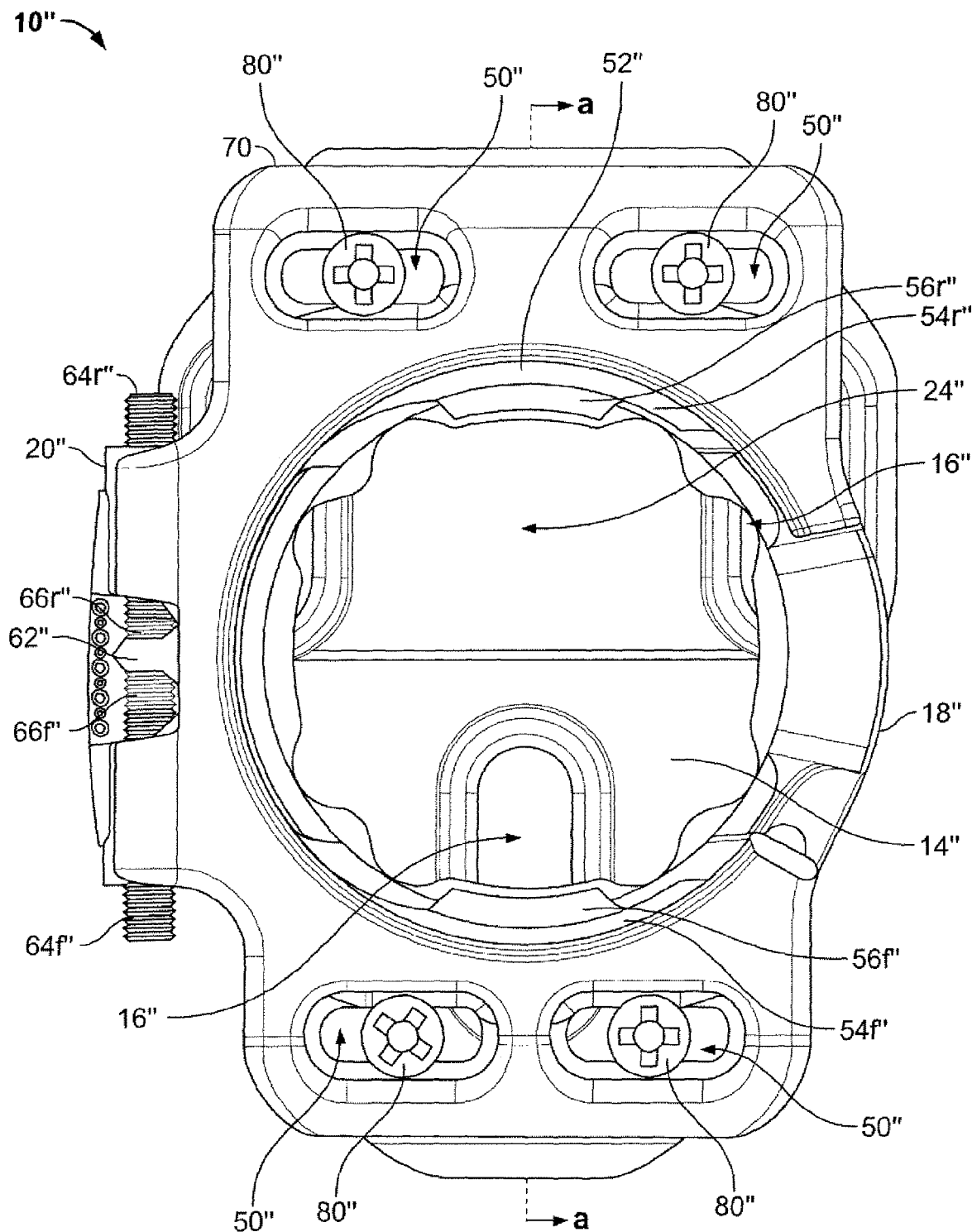
FIG. 10 is a bottom plan view of the third embodiment of the cleat assembly.
Figure 11:
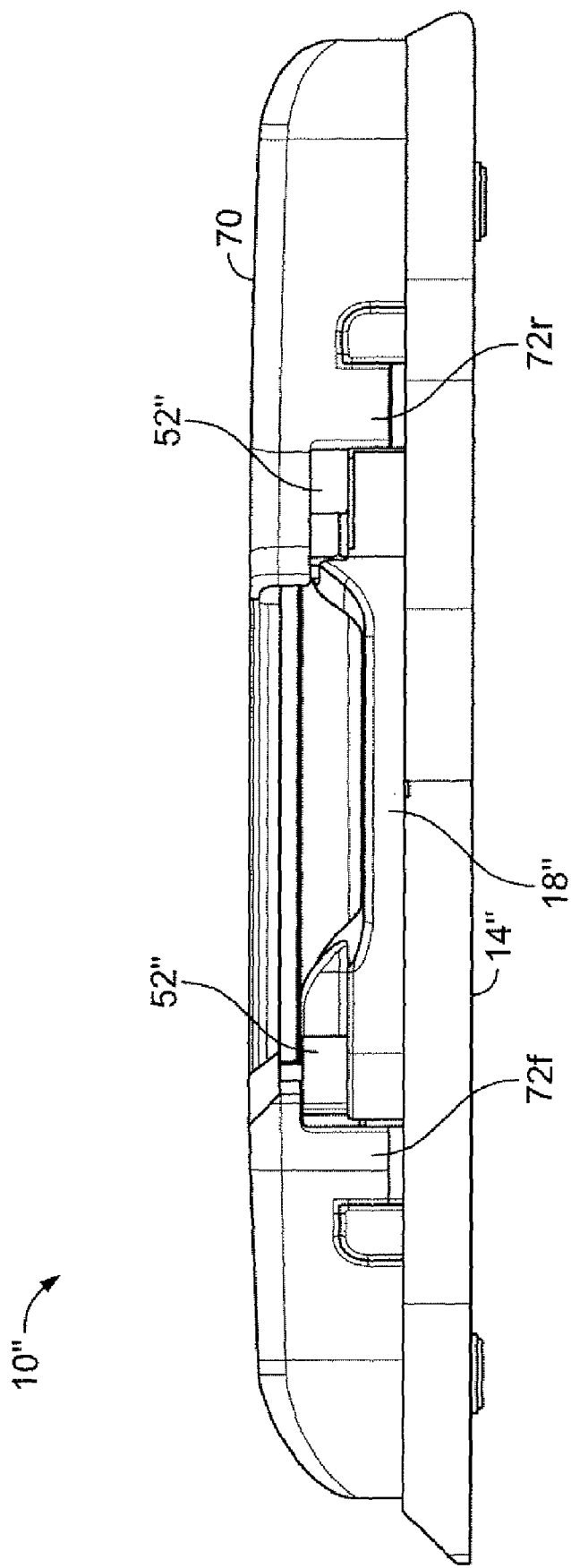
FIG. 11 is a left elevational view of the third embodiment of the cleat assembly.
Figure 12:
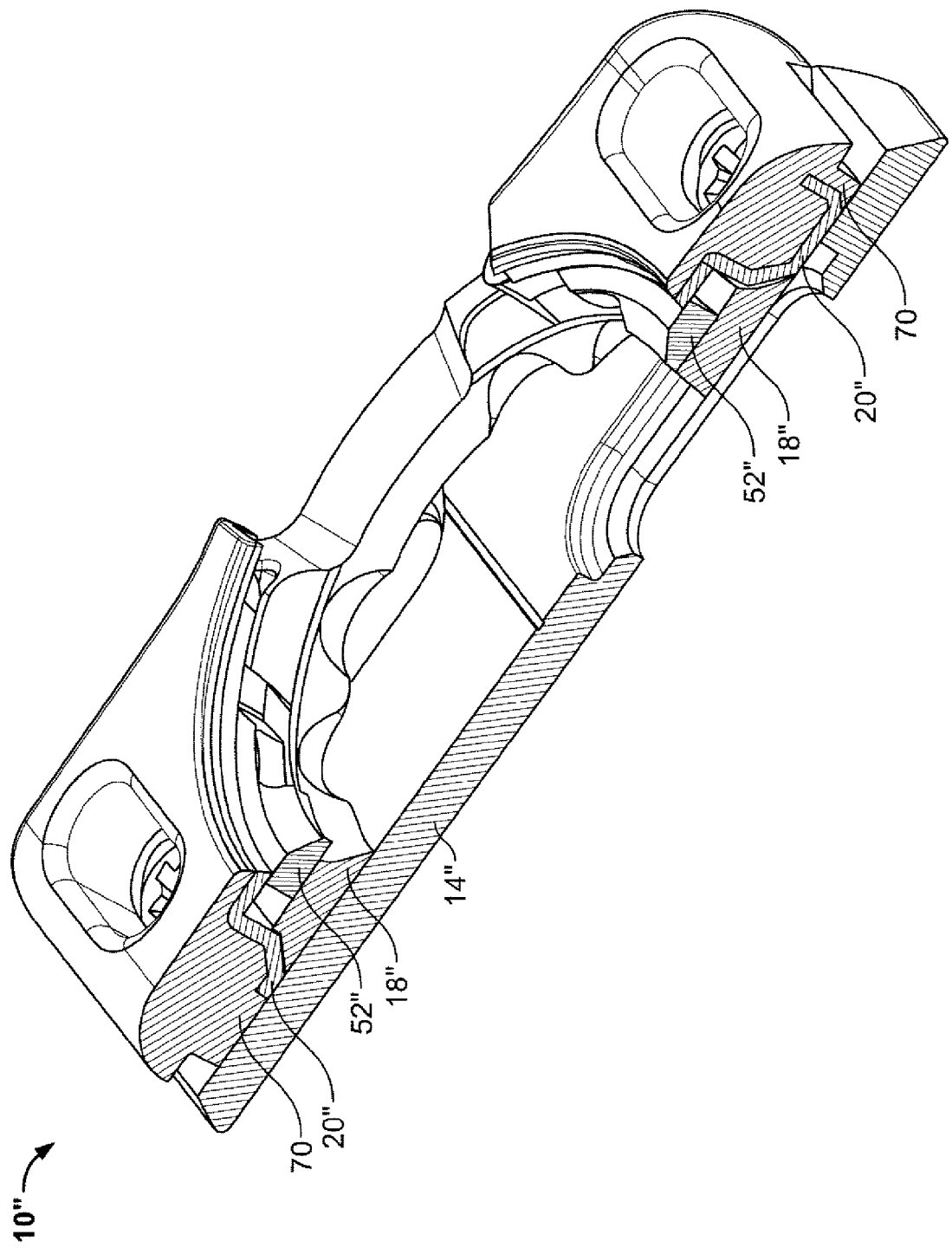
FIG. 12 is a cross-sectional view of the third embodiment of the cleat assembly taken along the line a-a in FIG. 10.

The unitary elastomeric cap 70, together with the spring housing 18" and bottom plate 20", define a circular central opening 24" sized and shaped to conformably receive the pedal 12'. The unitary cap 70 also includes four elongated openings 50" aligned with the openings 44" of the flanges 40f", 40r". Within the four openings 50" are accommodated four screws 22", which function to secure the bottom plate 20" and unitary cap 70 over the spring housing 18". As shown in FIGS. 9 and 10, the openings 50" are sized such that the sides of the screw heads 80" of the screws 22" rub against the sidewalls 84" of the openings 50", inhibiting the screws 22" from working their way loose from the base plate 14". In this way, the openings 50" act like threadlockers, helping to keep the screws 22" secured in the base plate.

The unitary cap 70 and bottom plate 20" are removably secured to the spring housing 18" by tabs 72f, 72r formed in the unitary cap 70 and by hooks 74f, 74r formed in the bottom plate 20", as shown in FIGS. 15-18. The hooks 74f, 74r engage projections 76f, 76r formed in the spring housing 18", while the tabs 72f, 72r engage indentations 78f, 78r formed in the spring housing. In operation, as shown in sequence in FIGS. 15-18, the user positions the hooks 74f, 74r so that they engage the projections 76f, 76r. The user then pivots the unitary cap 70 and bottom plate 20" with respect to the spring housing 18" so that the tabs 72f, 72r engage the indentations 78f, 78r. The cleat assembly 10" is shown in its assembled condition in FIG. 9.

The tabs 72f, 72r and flaps 74f, 74r thus function to help keep the spring housing 18", bottom plate 20", and spring clip 52" secured together, both prior to the initial installation of the cleat assembly 10" to the shoe and also in the event that the user detaches the cleat assembly 10" from the shoe. This feature makes both the initial installation and any re-installation of the cleat assembly 10" easier and reduces the possibility that the user might misplace parts of the cleat assembly while it is detached from the shoe.

Figure 13:
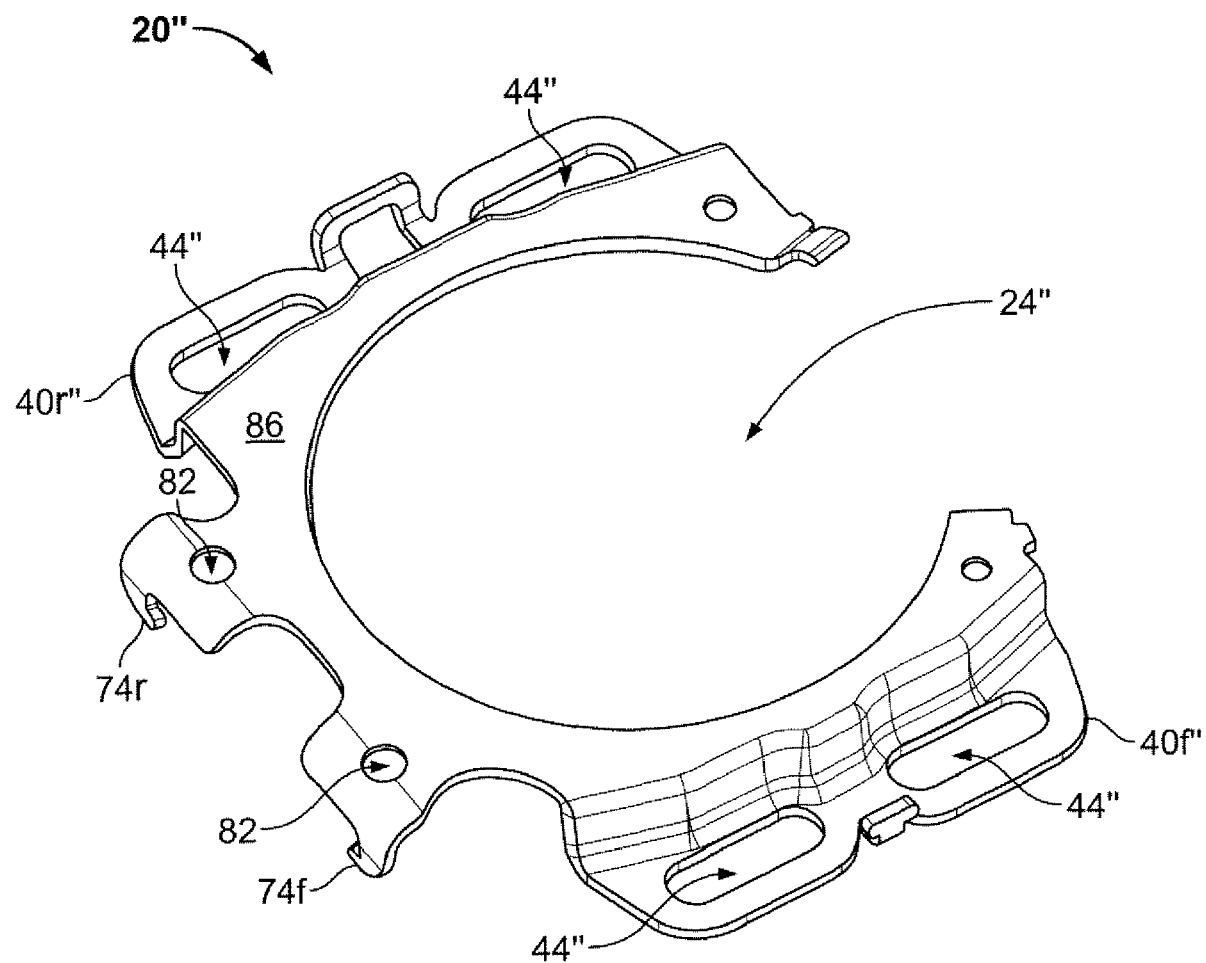
FIG. 13 is a perspective view of the bottom plate of the third embodiment of the cleat assembly.
Figure 14:
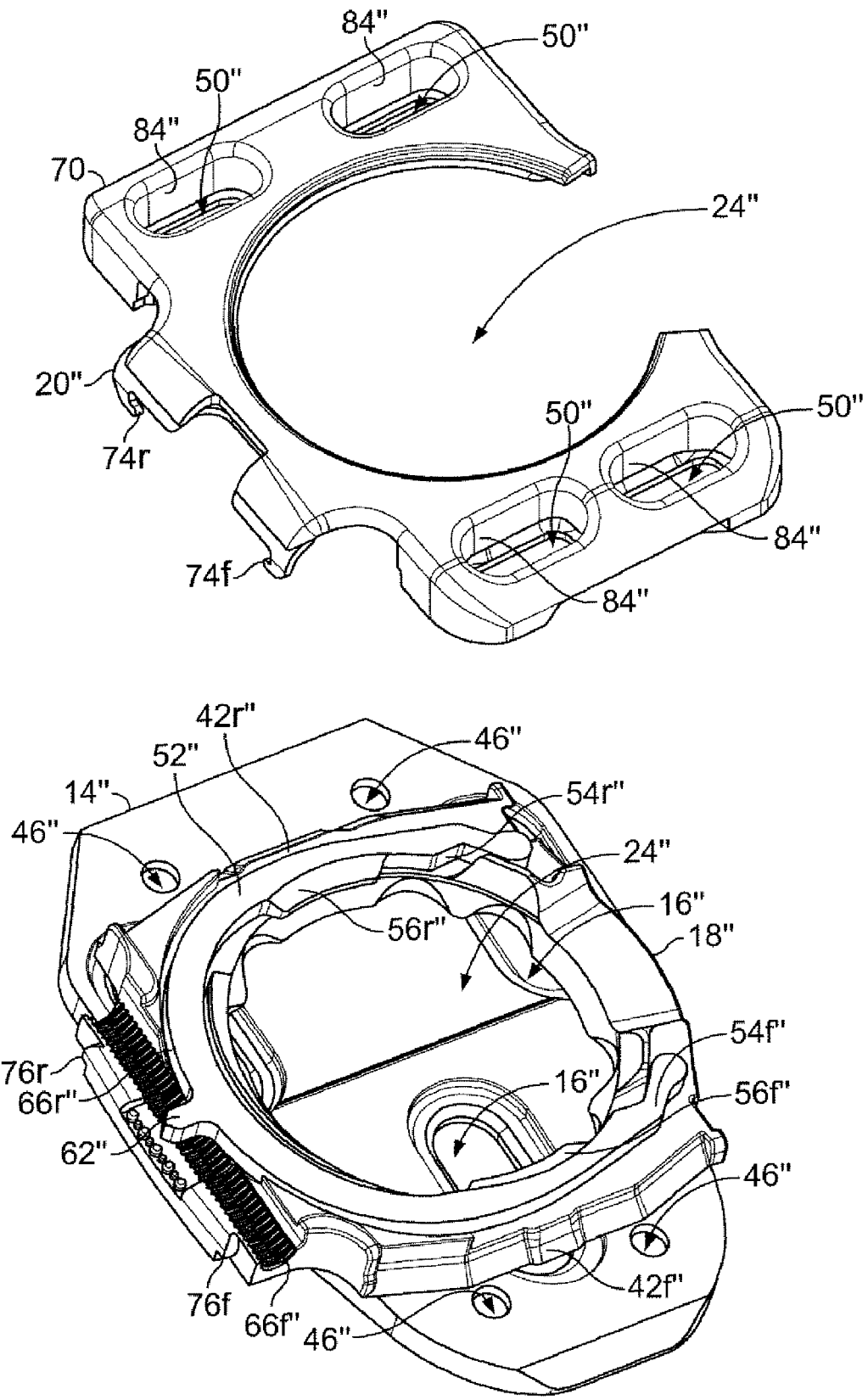
FIG. 14 is an exploded perspective view showing the base plate, spring housing, horseshoe-shaped spring clip, bottom plate, and unitary cap of the third embodiment of the cleat assembly.
Figure 15:
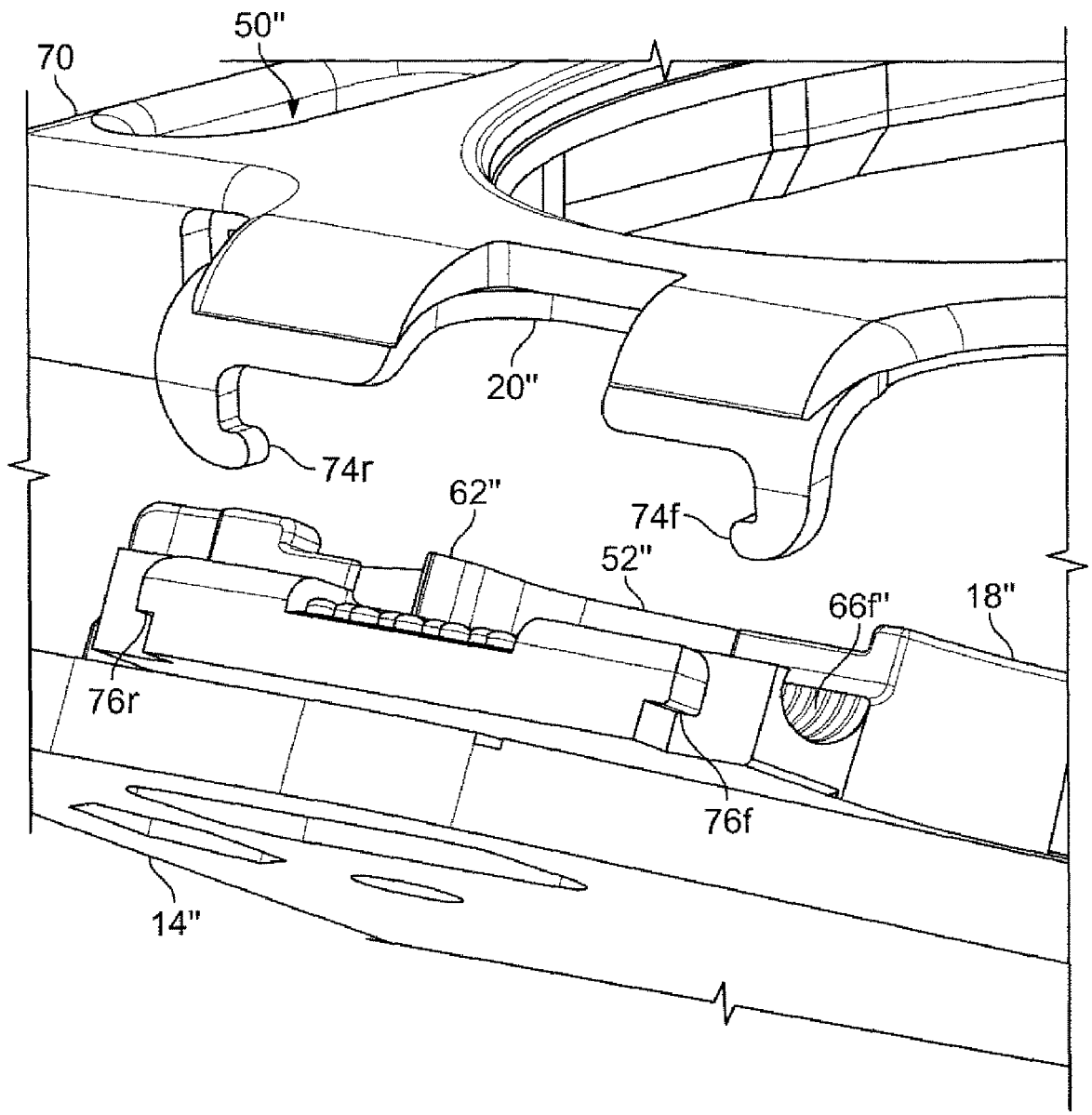
FIG. 15 is a close-up perspective view of the third embodiment of the cleat assembly, showing the hooks of the bottom plate prior to engagement with the spring housing.
Figure 16:
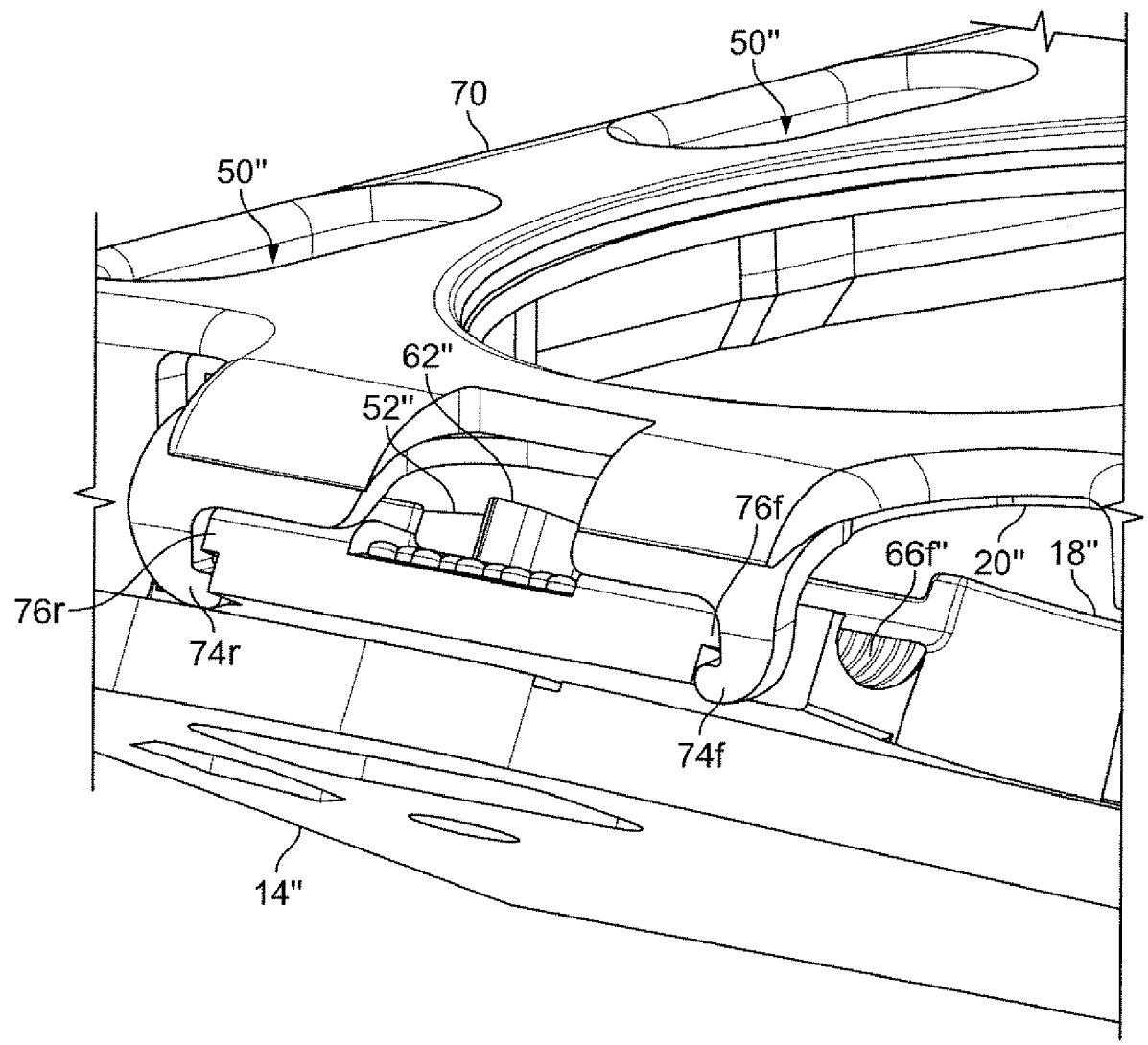
FIG. 16 is a close-up perspective view of the third embodiment of the cleat assembly, showing the hooks of the bottom plate engaging the spring housing.
Figure 17:
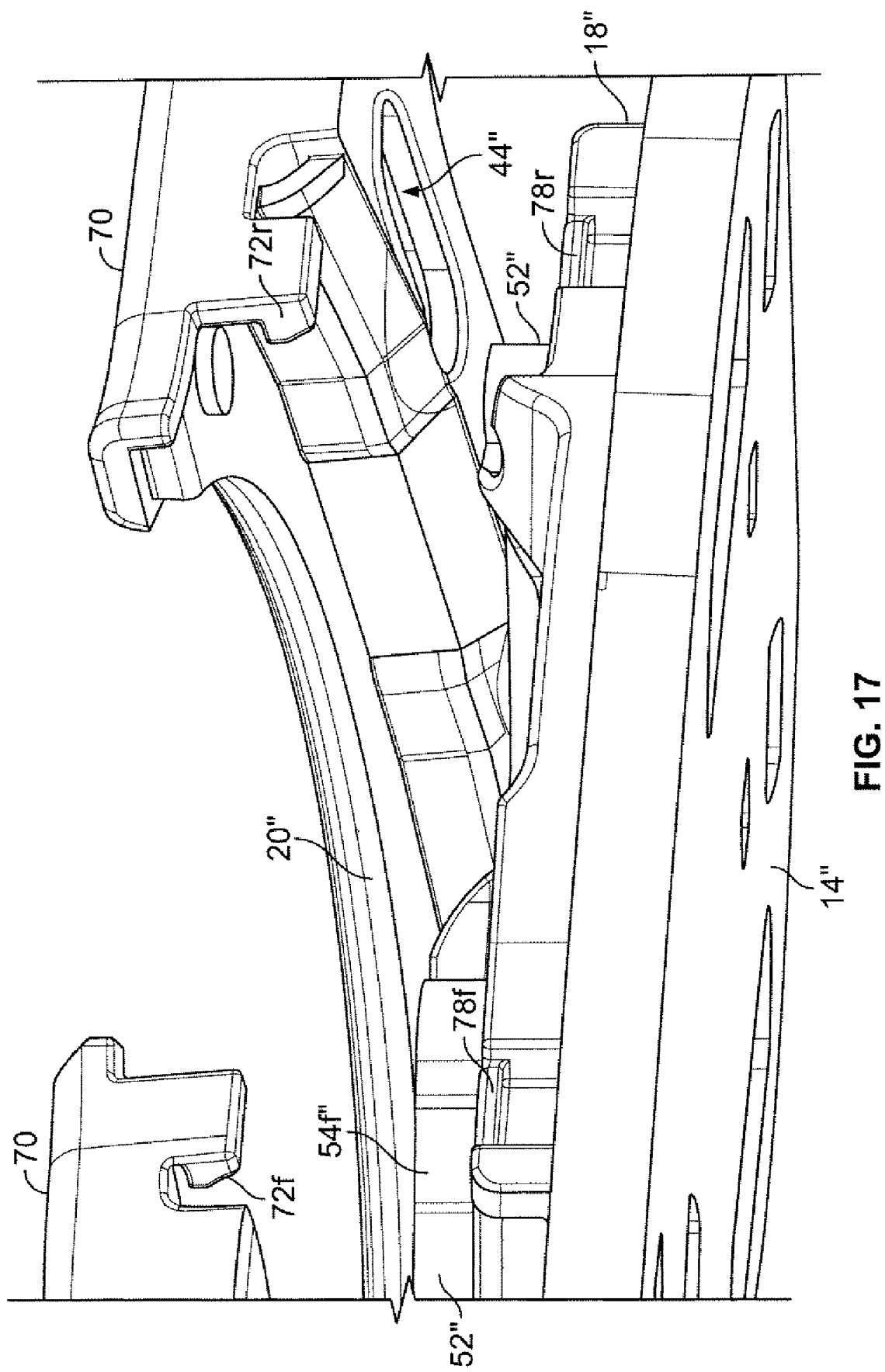
FIG. 17 is a close-up perspective view of the third embodiment of the cleat assembly, showing the tabs of the unitary cap prior to engagement with the spring housing.
Figure 18:
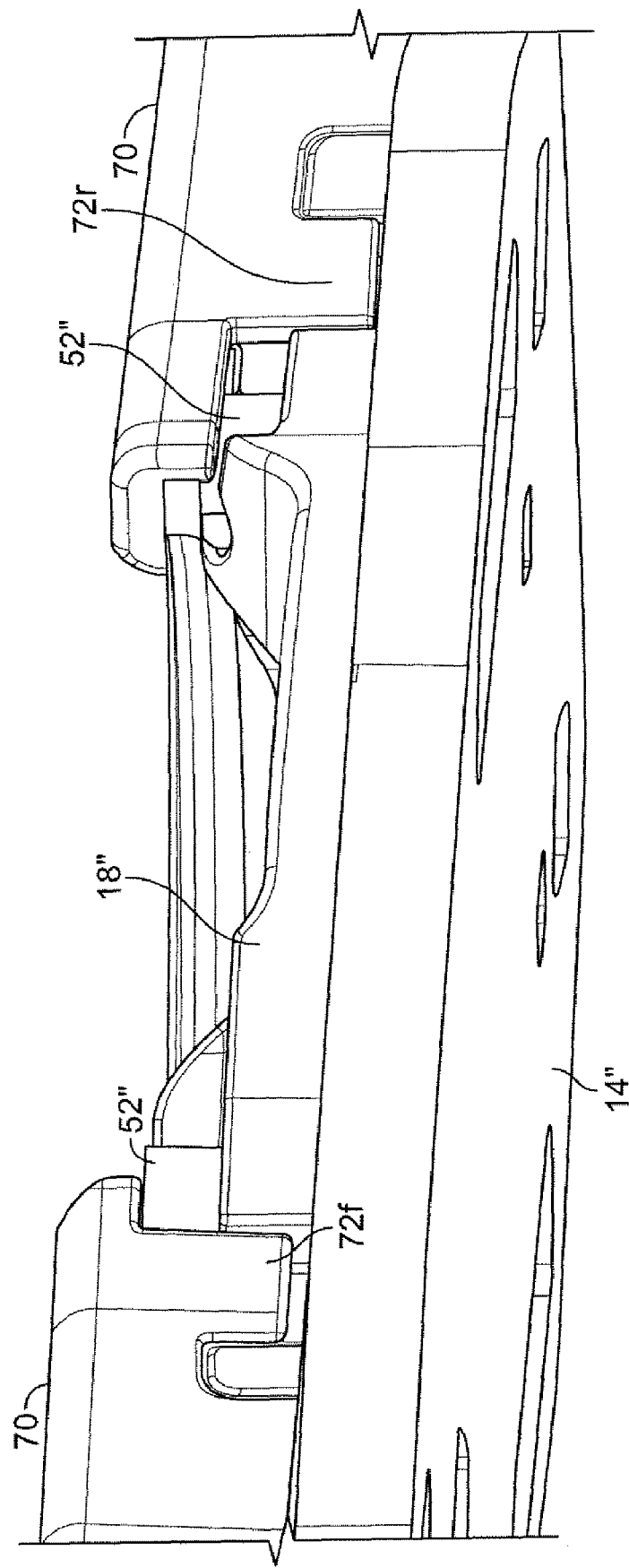
FIG. 18 is a close-up perspective view of the third embodiment of the cleat assembly, showing the tabs of the unitary cap engaging the spring housing.
Figure 19:
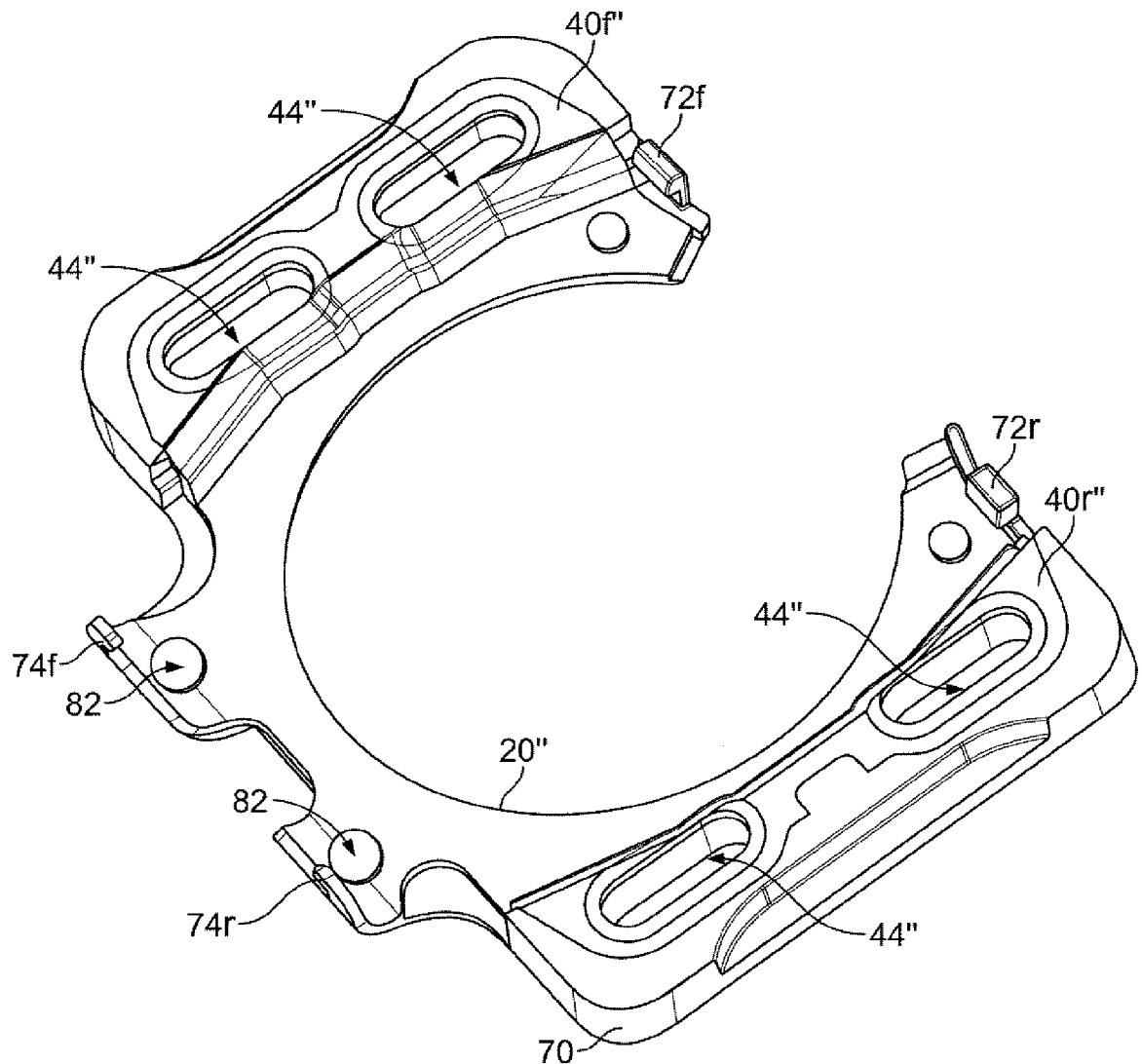
FIG. 19 is a perspective view showing the upper side of the bottom plate and unitary cap of the third embodiment of the cleat assembly.

Two holes 82 are formed in the confronting surfaces of the bottom plate 20" that retain the two set screws 64f", 64r", as best shown in FIGS. 13 and 19. The two holes 82 allow the two set screws 64*f*″, 64*r*″ to contact the elastomeric material of the unitary cap 70, inhibiting the set screws 64*f*″, 64*r*″ from working their way loose from the cleat assembly 10″. In this way, the holes 82 act like threadlockers, helping to keep the set screws 64*f*″, 64*r*″ secured in the cleat assembly.

With reference now to FIGS. 20-26, there is shown a fourth embodiment of a cleat assembly 10‴ in accordance with the invention. The cleat assembly 10‴ has many of the same components and attributes as the cleat assembly 10 of FIGS. 1-4, but it differs in that it substitutes a unitary elastomeric cap 70‴ for the forward and rearward elastomeric caps 48*f* and 48*r* of the first embodiment. Components of the two cleat assemblies that correspond to each other are identified in the drawings using the same reference numerals, with the reference numerals for the components of the embodiment of FIGS. 20-26 including triple prime marks (‴). As was the case with the cleat assembly 10 depicted in FIGS. 1-4, the cleat assembly 10‴ depicted in FIGS. 20-26 is configured for attachment to the user's left shoe, but it will be appreciated that a similar cleat assembly could be oppositely configured for attachment to the user's right shoe.

The cleat assembly 10‴ of FIGS. 20-26 is similar to the cleat assembly 10 of FIGS. 1-4 in that it is configured to allow its steel bottom plate 2‴ to be tightened over the plastic spring housing 18‴ without substantially affecting the size of the space that accommodates the forward spring clip 26*f*‴ and rearward spring clip 26*r*‴. The cleat assembly 10‴, likewise, is configured such that only the unitary elastomeric cap 70‴ engages the ground when the user walks about. The cleat assembly 10‴ is configured to engage the pedal 12 shown in FIGS. 3 and 4.

The unitary elastomeric cap 70‴ is preferably bonded to the bottom surface 86‴ of the steel bottom plate 20‴ and disposed over substantially the entire bottom surface of the bottom plate. The unitary elastomeric cap 70‴ engages the ground when the user walks thereon and incorporates a slip-resistant, molded elastomeric material, e.g., polyurethane. The unitary elastomeric cap 70‴ helps the user's foot to roll comfortably when the user walks, and helps keep the steel bottom plate 20‴ from scratching the bicycle pedal.

Figure 20:
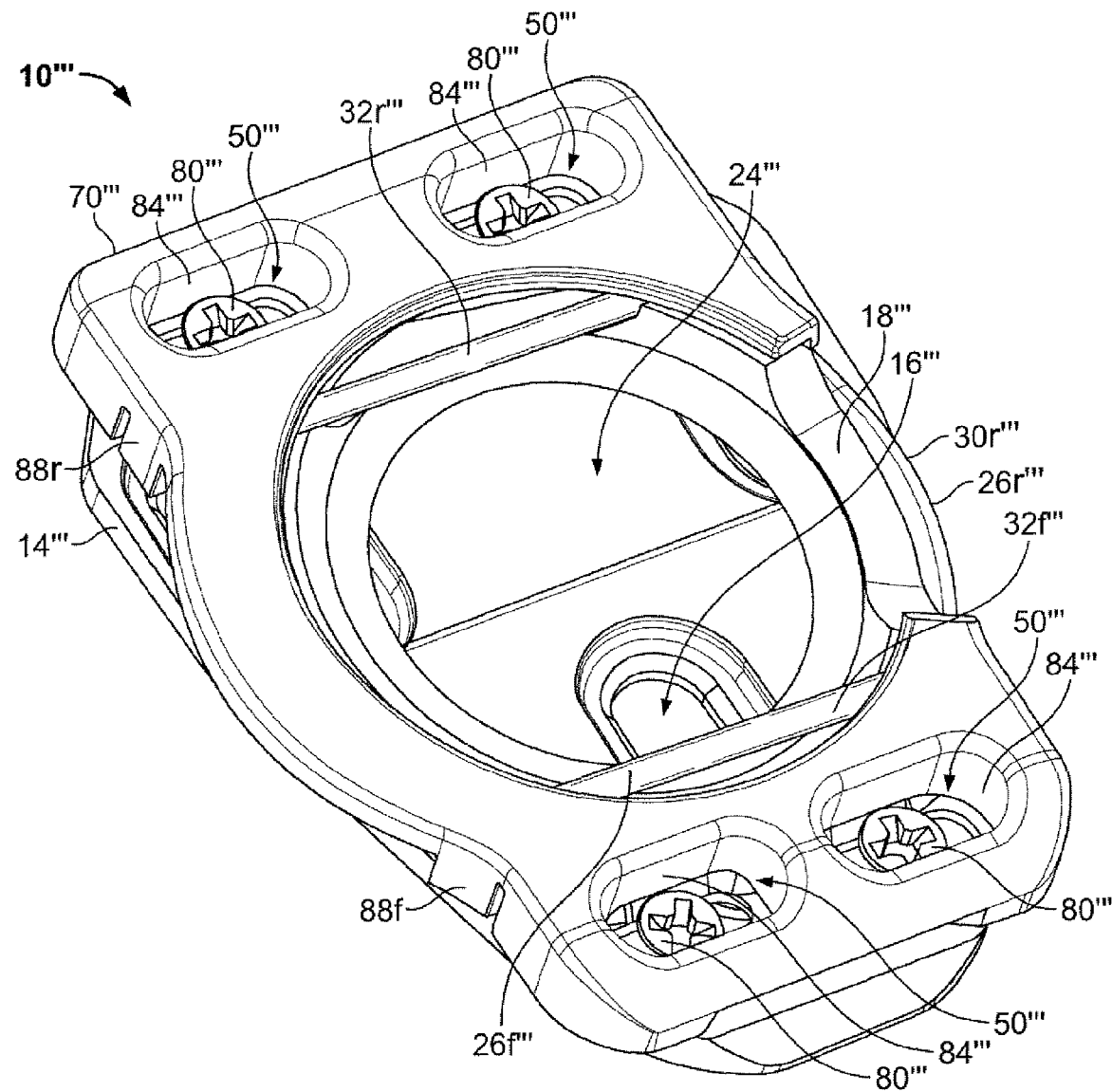
FIG. 20 is a perspective view of a fourth embodiment of a cleat assembly in accordance with the invention, shown in its assembled condition.
Figure 21:
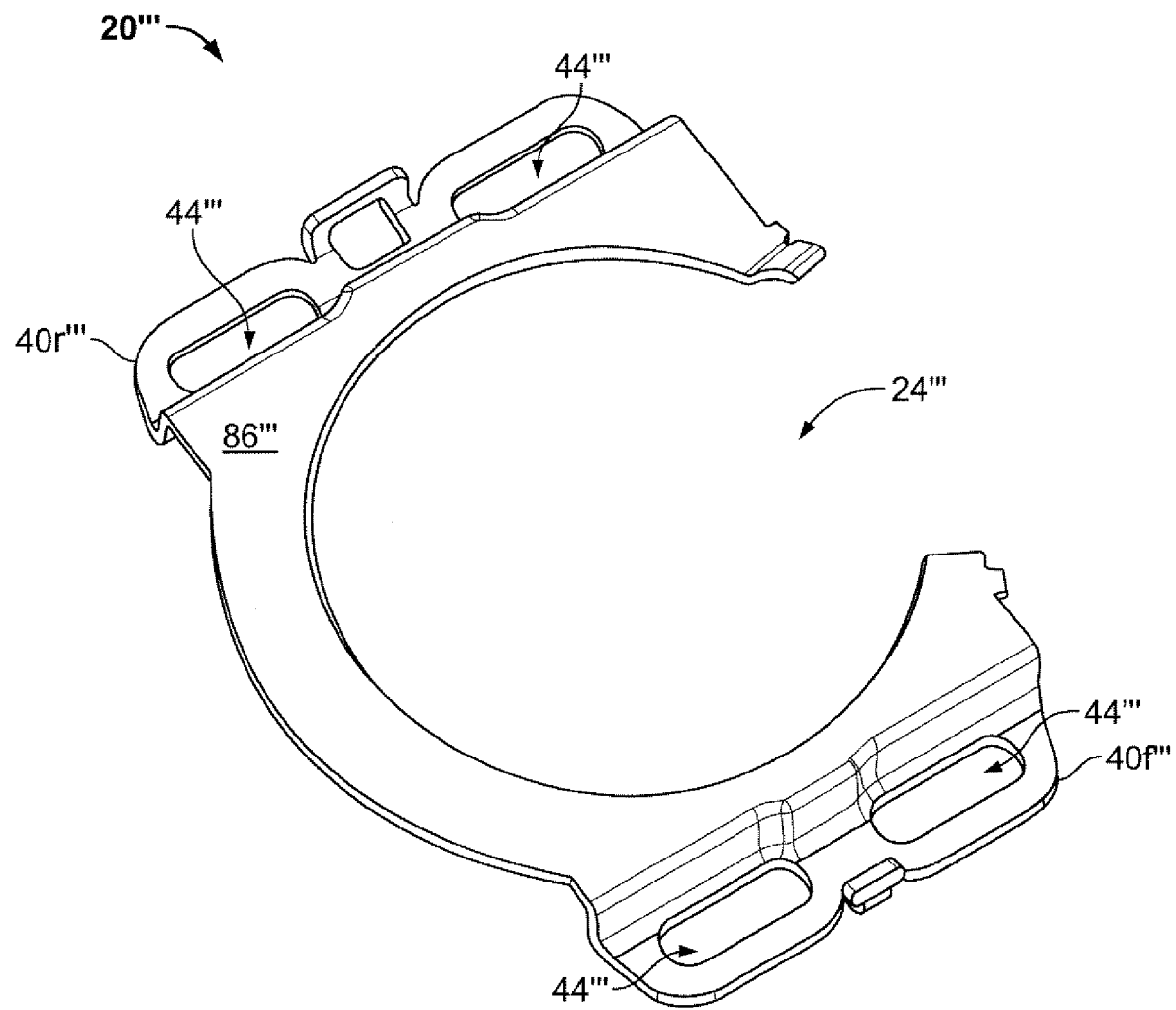
FIG. 21 is a perspective view of the bottom plate of the fourth embodiment of the cleat assembly.
Figure 22:
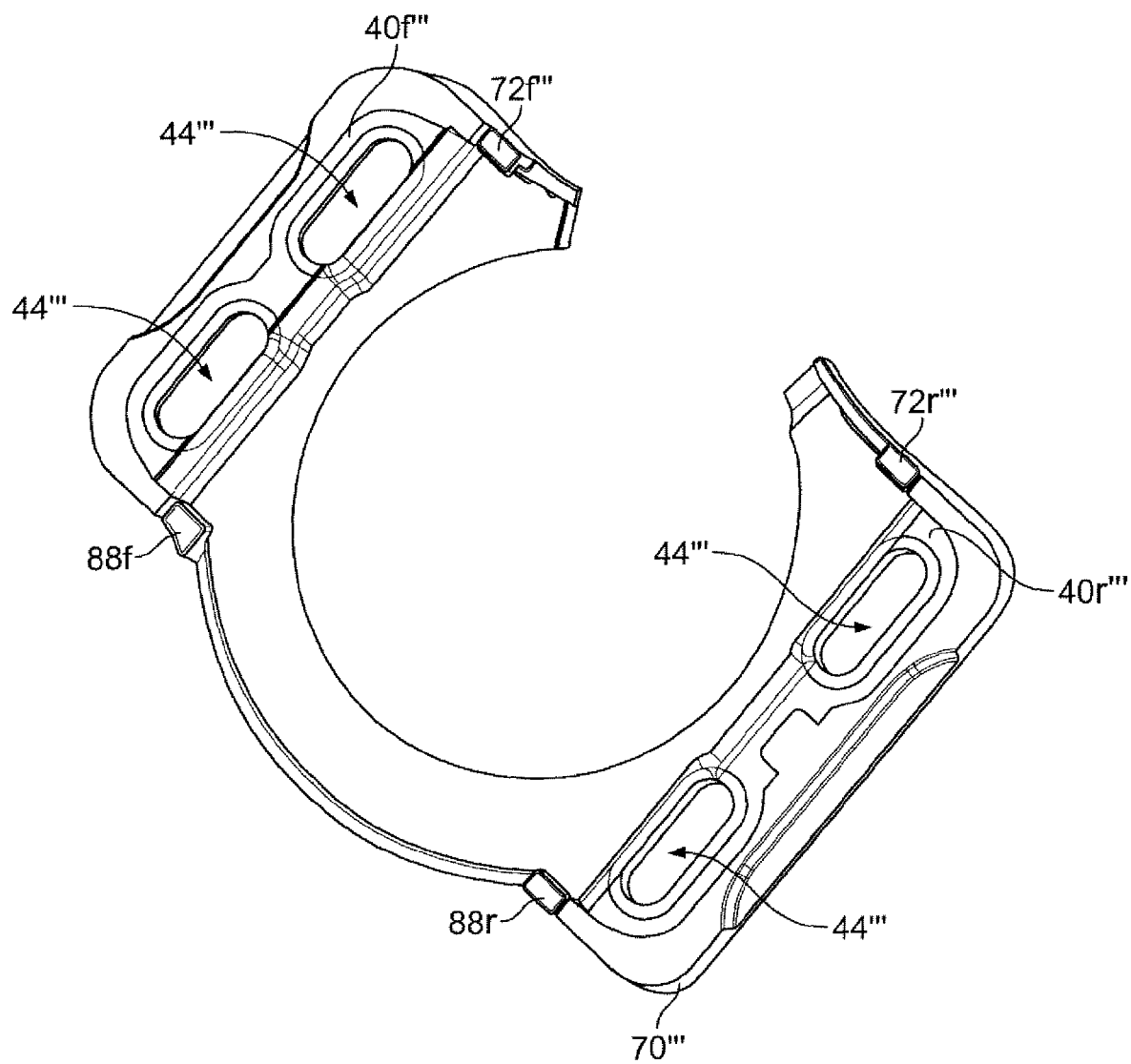
FIG. 22 is a perspective view showing the upper side of the bottom plate and unitary cap of the fourth embodiment of the cleat assembly.
Figure 23:
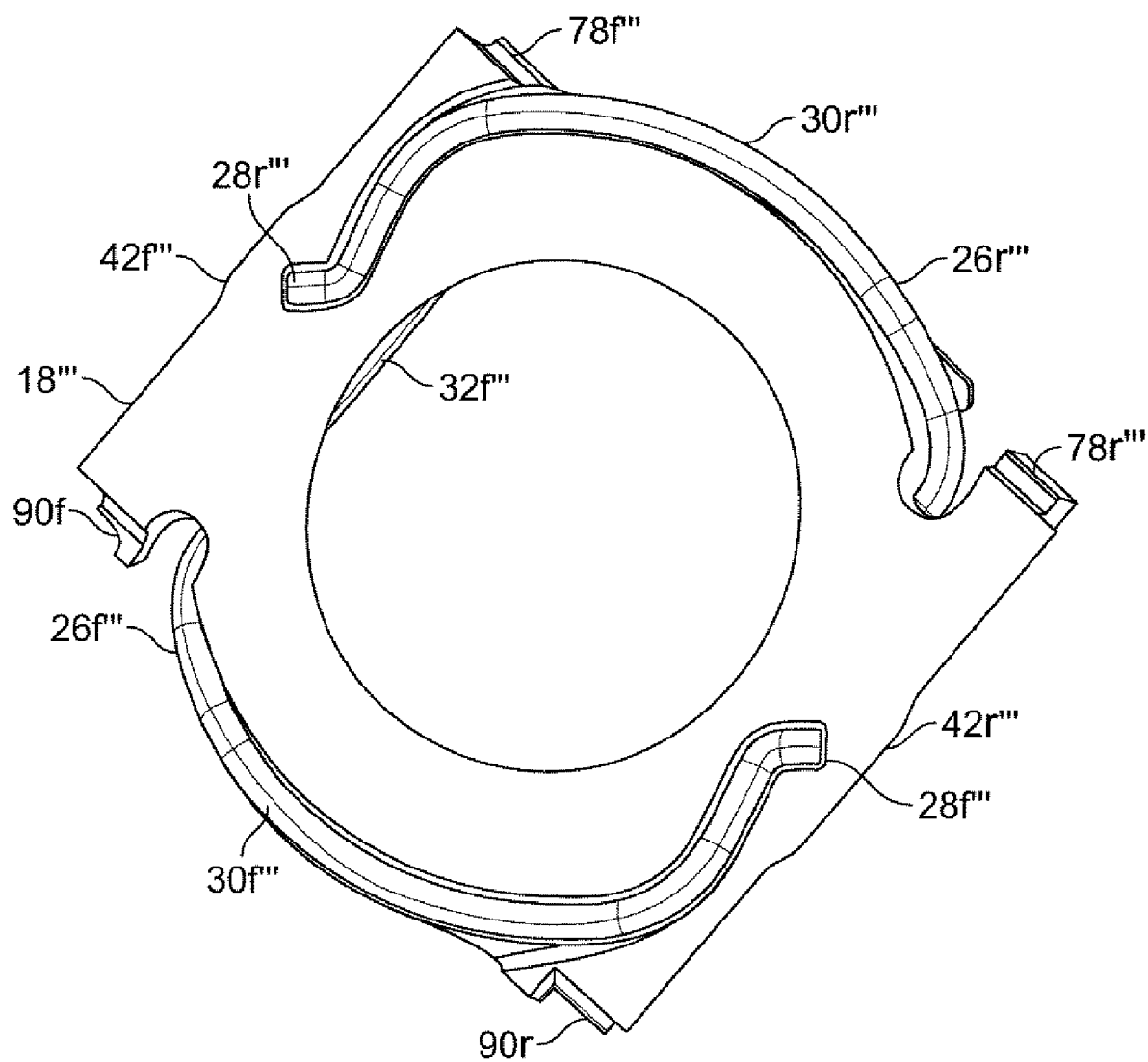
FIG. 23 is a perspective view showing the upper side of the spring housing, forward spring clip, and rearward spring clip of the fourth embodiment of the cleat assembly.
Figure 24:
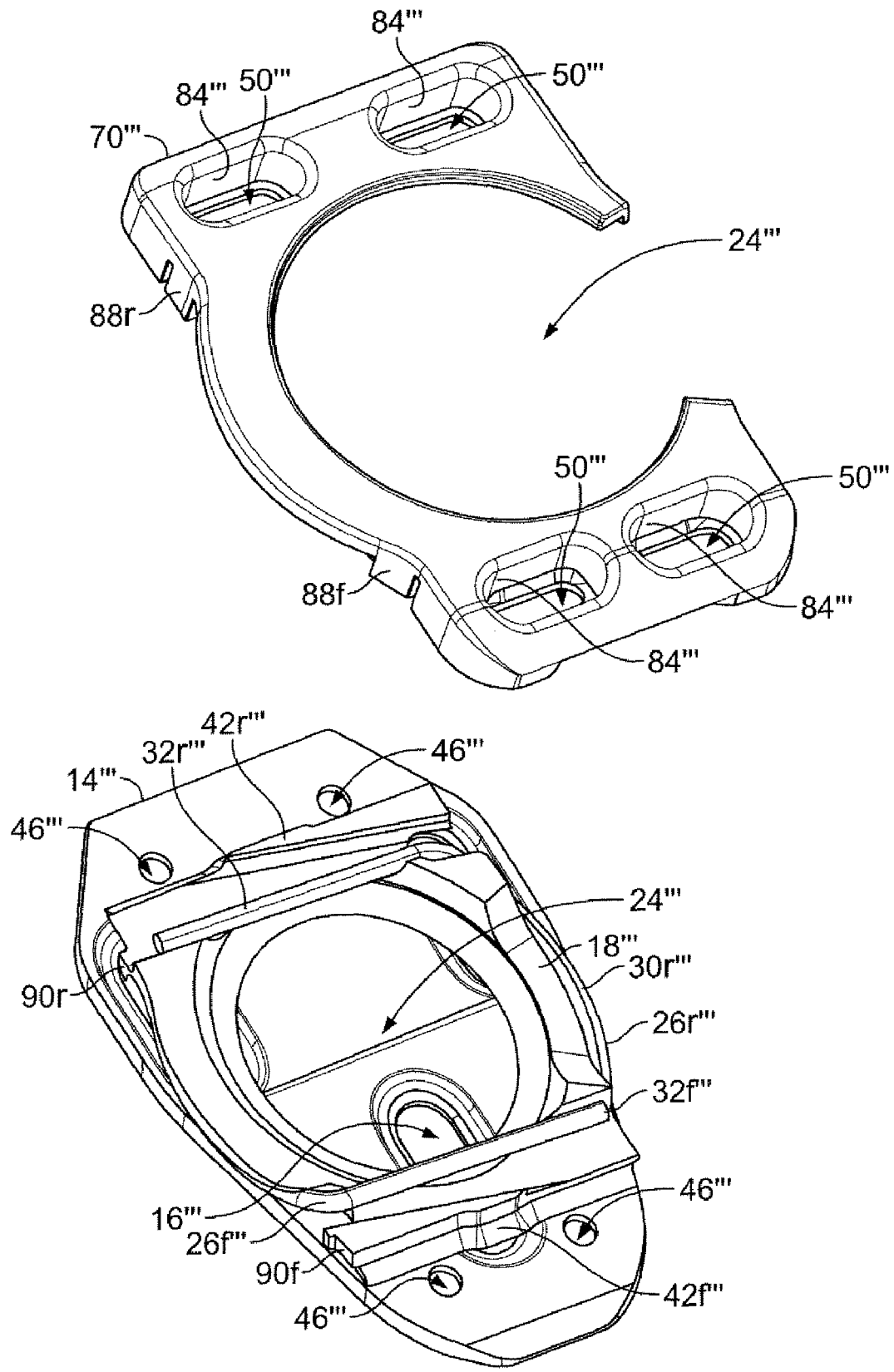
FIG. 24 is an exploded perspective view showing the base plate, spring housing, forward spring clip, rearward spring clip, bottom plate, and unitary cap of the fourth embodiment of the cleat assembly.
Figure 25:
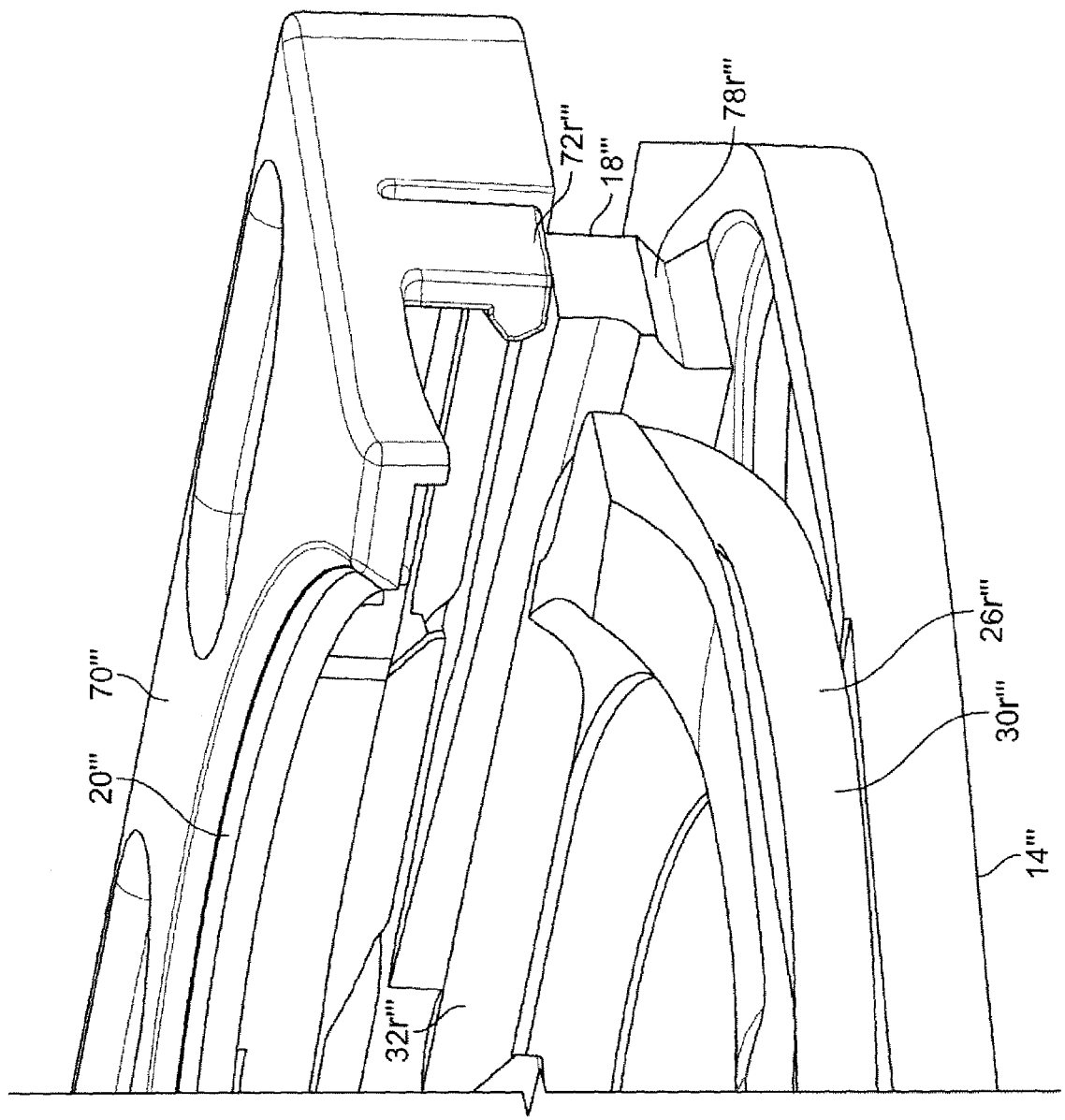
FIG. 25 is a close-up perspective view of the fourth embodiment of the cleat assembly, showing the inner tabs of the unitary cap prior to engagement with the spring housing.

The unitary elastomeric cap 70‴, together with the spring housing 18‴ and bottom plate 20‴, define a circular central opening 24‴ sized and shaped to conformably receive the pedal 12. The unitary cap 70‴ also includes four elongated openings 50‴ aligned with the openings 44‴ of the flanges 40*f*‴, 40*r*‴. Within the four openings 50‴ are accommodated four screws 22‴, which function to secure the bottom plate 20‴ and unitary cap 70‴ over the spring housing 18‴. As shown in FIG. 20, the openings 50‴ are sized such that the sides of the screw heads 80‴ of the screws 22‴ rub against the sidewalls 84‴ of the openings 50‴, inhibiting the screws 22‴ from working their way loose from the base plate 14‴. In this way, the openings 50‴ act like threadlockers, helping to keep the screws 22‴ secured in the base plate.

The unitary cap 70‴ and bottom plate 20‴ are removably secured to the spring housing 18‴ by tabs 72*f*‴, 72*r*‴, 88*f*, and 88*r* formed in the unitary cap 70‴, as shown in FIGS. 20, 22, 25 and 26. The tabs 72*f*‴, 72*r*‴ engage indentations 78*f*‴, 78*r*‴ formed in the spring housing, while the tabs 88*f*, 88*r* engage indentations 90*f*, 90*r* formed in the spring housing. In operation, as shown in sequence in FIGS. 25-26, the user positions the unitary cap 70‴ and bottom plate 20‴ with respect to the spring housing 18‴ so that the tabs 72*f*‴, 72*r*‴ align with the indentations 78*f*‴, 78*r*‴. On the outer side of the cleat assembly 10‴, the tabs 88*f*, 88*r* align with the indentations 90*f*, 90*r*. The user then presses the unitary cap 70‴ and bottom plate 20‴ against the spring housing 18‴ so that the tabs 72*f*‴, 72*r*‴ engage the indentations 78*f*‴, 78*r*‴, while the tabs 88*f*, 88*r* engage the indentations 90*f*, 90*r*. The cleat assembly 10‴ is shown in its assembled condition in FIG. 20.

The tabs 72*f*‴, 72*r*‴, 88*g*, 88*r* thus function to help keep the spring housing 18‴, bottom plate 20‴, forward spring clip 26*f*‴, and rearward spring clip 26*r*‴ secured together, both prior to the initial installation of the cleat assembly 10‴ to the shoe and also in the event that the user detaches the cleat assembly 10‴ from the shoe. This feature makes both the initial installation and any re-installation of the cleat assembly 10‴ easier and reduces the possibility that the user might misplace parts of the cleat assembly while it is detached from the shoe.

It should be appreciated from the foregoing description that the present invention provides an improved cleat assembly containing one or more spring clips configured for releasably securing the assembly to a pedal. Specifically, the cleat assembly is configured such that tightening the cleat onto the sole of a user's shoe has substantially no effect on the free flexing of the spring clip while it is engaging or disengaging to/from the pedal. In addition, in one embodiment, the cleat assembly incorporates a pair of soft plastic caps that frictionally engage the ground when the user walks about, to reduce the possibility of the user slipping and to eliminate undesired wear of critical assembly components. In alternative embodiments of the invention, the cleat assembly includes a unitary cap preferably disposed over substantially the entire bottom surface of the cleat bottom and configured so that the cleat assembly stays in one piece, both prior to the initial installation of the cleat assembly to the shoe and also in the event that the user detaches the cleat assembly from the shoe. Further, for embodiments of cleat assemblies of the kind incorporating one or more adjustable set screws for adjusting the assemblies' float angles, threaded apertures for the set screws are formed by the confronting surfaces of a plastic upper plate and a metallic bottom plate, wherein the threads are formed only in the plastic upper plate. This allows the upper plate to be conveniently formed of an injection-molded plastic material and the bottom plate to be conveniently stamped from a piece of sheet metal. In a preferred embodiment of the invention, one or more holes are formed in the confronting surfaces of the metallic bottom plate, allowing the one or more set screws to contact the elastomeric material of the cap or caps, inhibiting the one or more set screws from working their way loose from the cleat assembly. In another preferred embodiment of the invention, the cap or caps are configured to have a plurality of openings therein, each of the plurality of openings being configured to receive the head of at least one screw and sized so that the screw heads contact the sidewalls of the openings, inhibiting the screws from working their way loose.

Although the invention has been described in detail with reference only to the presently preferred embodiments, those skilled in the art will appreciate that various modifications can be made without departing from the invention. Accordingly, the invention is

I claim:

1. A cleat assembly configured to be releasably secured to a clipless pedal, the cleat assembly comprising:
   a first plate having a forward end and a rearward end; and
   a second plate disposed over the first plate, the second plate having a forward flange projecting forward of the forward end of the first plate, a rearward flange projecting rearward of the rearward end of the first plate, and a bottom surface;
   a set screw;
   wherein the first and second plates, together, comprise confronting surfaces that define a threaded aperture sized and configured to receive the set screw;
   wherein a space is defined between the first and second plates; and wherein an aperture is defined in the second plate, the aperture being sized and configured to receive the clipless pedal.

2. A cleat assembly as defined in claim 1, further comprising a cap disposed over at least part of the bottom surface of the second plate.

3. A cleat assembly as defined in claim 2, wherein the cap is disposed over substantially all of the bottom surface of the second plate.

4. A cleat assembly as defined in claim 2, wherein the cap comprises a molded elastomeric material.

5. A cleat assembly as defined in claim 2, further comprising a plurality of screws for securing the second plate to the first plate;
wherein the forward flange is configured to have at least one opening therein sized and configured to receive at least one of the plurality of screws; and
wherein the rearward flange is configured to have at least one opening therein sized and configured to receive at least another one of the plurality of screws.

6. A cleat assembly as defined in claim 5, wherein:
the cap is configured to have a plurality of openings therein, each of the plurality of openings being sized and configured to receive at least one of the plurality of screws; and
the at least one opening in the forward flange and the at least one opening in the rearward flange are aligned with the plurality of openings in the cap.

7. A cleat assembly as defined in claim 6, wherein:
each of the plurality of screws has a screw head;
each of the plurality of openings in the cap has a sidewall; and
the openings in the cap are sized and configured so that the screw heads contact the sidewalls when the screws have been received within the openings.

8. A cleat assembly as defined in claim 2, further comprising a second cap, wherein:
one cap is disposed over the forward flange of the second plate; and
one cap is disposed over the rearward flange of the second plate.

9. A cleat assembly as defined in claim 2, wherein at least one of the second plate and cap further comprises securing means for removably securing the second plate and cap to the first plate.

10. A cleat assembly as defined in claim 9, wherein the first plate further comprises engagement means for engaging the securing means.

11. A cleat assembly as defined in claim 2, wherein:
a hole is formed in the confronting surface of the second plate; and
the cap contacts the set screw through the hole formed in the confronting surface of the second plate.

12. A cleat assembly configured to be releasably secured to a clipless pedal, the cleat assembly comprising:
a first plate;
a second plate disposed over the first plate and having a bottom surface, wherein a space is defined between the first and second plates, and wherein the first and second plates, together, comprise confronting surfaces that define a threaded aperture;
a spring clip located in the space between the first and second plates, for releasably engaging the clipless pedal; and a set screw sized and configured to be received in the threaded aperture;
wherein the first plate comprises a molded plastic material;
wherein the second plate comprises a metallic material;
wherein an aperture is defined in the second plate, the aperture being sized and configured to receive the clipless pedal; and
wherein the position of the set screw in the threaded aperture is adjustable to define a float angle through which the cleat assembly can pivot relative to the clipless pedal without being released therefrom.

13. A cleat assembly as defined in claim 12, further comprising a cap disposed over at least part of the bottom surface of the second plate.

14. A cleat assembly as defined in claim 13, wherein the cap is disposed over substantially all of the bottom surface of the second plate.

15. A cleat assembly as defined in claim 13, wherein the cap comprises a molded elastomeric material.

16. A cleat assembly as defined in claim 13 further comprising:
a plurality of screws for securing the second plate to the first plate;
a forward flange formed in the second plate; and
a rearward flange formed in the second plate;
wherein the forward flange is configured to have at least one opening therein sized and configured to receive at least one of the plurality of screws; and
wherein the rearward flange is configured to have at least one opening therein sized and configured to receive at least another one of the plurality of screws.

17. A cleat assembly as defined in claim 16, wherein:
the cap is configured to have a plurality of openings therein, each of the plurality of openings being sized and configured to receive at least one of the plurality of screws; and
the at least one opening in the forward flange and the at least one opening in the rearward flange are aligned with the plurality of openings in the cap.

18. A cleat assembly as defined in claim 17, wherein:
each of the plurality of screws has a screw head;
each of the plurality of openings in the cap has a sidewall; and
the openings in the cap are sized and configured so that the screw heads contact the sidewalls when the screws have been received within the openings.

19. A cleat assembly as defined in claim 16, further comprising a second cap, wherein:
one cap is disposed over the forward flange of the second plate; and
one cap is disposed over the rearward flange of the second plate.

20. A cleat assembly as defined in claim 13, wherein at least one of the second plate and cap further comprises securing means for removably securing the second plate and cap to the first plate.

21. A cleat assembly as defined in claim 20, wherein the first plate further comprises engagement means for engaging the securing means.

22. A cleat assembly as defined in claim 13, wherein:
a hole is formed in the confronting surface of the second plate; and
the cap contacts the set screw through the hole formed in the confronting surface of the second plate.

* * * * *